US012125616B2

(12) United States Patent
Shinoura

(10) Patent No.: US 12,125,616 B2
(45) **Date of Patent: *Oct. 22, 2024**

(54) CHIP RESISTOR

(71) Applicant: ROHM CO., LTD., Kyoto (JP)

(72) Inventor: Takanori Shinoura, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,621

(22) Filed: May 9, 2023

(65) Prior Publication Data

US 2023/0274861 A1 Aug. 31, 2023

Related U.S. Application Data

(63) Continuation of application No. 17/430,204, filed as application No. PCT/JP2020/007960 on Feb. 27, 2020, now Pat. No. 11,688,532.

(30) Foreign Application Priority Data

Mar. 18, 2019 (JP) ................................ 2019-049482

(51) Int. Cl.
*H01C 1/14* (2006.01)
*H01C 7/00* (2006.01)
(Continued)

(52) U.S. Cl.
CPC ................ *H01C 1/14* (2013.01); *H01C 7/00* (2013.01); *H01C 17/006* (2013.01); *H01C 17/281* (2013.01)

(58) Field of Classification Search
CPC .......... H01C 1/14; H01C 7/00; H01C 17/006; H01C 17/281
See application file for complete search history.

(56) References Cited

U.S. PATENT DOCUMENTS 6,492,896 B2 * 12/2002 Yoneda .................. H01C 7/003 338/195
7,782,174 B2 * 8/2010 Urano .................... H01C 1/142 338/307

(Continued)

FOREIGN PATENT DOCUMENTS

JP 2008-53251 A 3/2008
JP 2008-84905 * 4/2008

(Continued)

OTHER PUBLICATIONS

International Search Report issued in PCT/JP2020/007960, Jun. 2, 2020 (2 pages).

(Continued)

*Primary Examiner* — Kyung S Lee
(74) *Attorney, Agent, or Firm* — HSML P.C.

(57) ABSTRACT

A chip resistor includes a substrate, two top electrodes, a resistor element, two back electrodes, and two side electrodes. The substrate has a top surface, a back surface and two side surface. The top and back surfaces face away in the thickness direction of the substrate. The side surfaces, spaced apart in a predetermined direction orthogonal to the thickness direction, are connected to the top and back surfaces. The top electrodes, spaced apart in the predetermined direction, are in contact with the top surface. The resistor element, disposed on the top surface, is connected to the top electrodes. The back electrodes, spaced apart in the predetermined direction, are in contact with the back surface. The side electrodes, held in contact with the side surfaces, are connected to the top and back electrodes. Each back electrode has a first and a second layer. The first layer is in contact with the back surface. The second layer, covering a part of the first layer, is made of a material containing metal particles and synthetic resin.

18 Claims, 24 Drawing Sheets

(51) Int. Cl.
*H01C 17/00* (2006.01)
*H01C 17/28* (2006.01)

(56) References Cited

U.S. PATENT DOCUMENTS

| | | | | |
|---|---|---|---|---|
| 11,688,532 | B2 * | 6/2023 | Shinoura | H01C 17/006 338/204 |
| 2018/0158578 | A1 * | 6/2018 | Akahane | H01C 1/142 |

FOREIGN PATENT DOCUMENTS

| | | | |
|---|---|---|---|
| JP | 2008-84905 | A | 4/2008 |
| JP | 2011-165752 | A | 8/2011 |
| JP | 2013-74044 | A | 4/2013 |
| JP | 2018-32670 | A | 3/2018 |

OTHER PUBLICATIONS

Office Action received in the corresponding Japanese Patent application, Jan. 9, 2024, and machine translation (8 pages).
Decision of Refusal received in the corresponding Japanese Patent application, Jun. 11, 2024, and machine translation (6 pages).

* cited by examiner

CHIP RESISTOR

TECHNICAL FIELD

The present disclosure relates to a chip resistor.

BACKGROUND ART

Conventionally, chip resistors for surface-mounting on wiring boards of various electronic devices are widely known. Patent Document 1 discloses an example of such a chip resistor. The chip resistor includes an insulating substrate, a pair of top electrodes and a pair of back electrodes disposed on opposite ends of the insulating substrate, a resistor element electrically connected to the top electrodes, and a pair of end-surface electrodes electrically connecting the top electrodes and the back electrodes.

The chip resistor is mounted on a wiring board with solder. During the use of the chip resistor, heat is generated from the resistor element. This causes the thermal stress due to the difference in thermal strain between the back electrodes and the solder to act on the solder. When a relatively large thermal stress repetitively acts on the solder, a crack may be formed in the solder. Such a crack in the solder may obstruct the current path between the wiring board and the chip resistor. Therefore, for a chip resistor, it is required to take measures to prevent cracks in the solder due to thermal stress.

TECHNICAL REFERENCE

Patent Document

Patent Document 1: JP-A-2008-53251

SUMMARY OF THE INVENTION

Problems to be Solved by the Invention

In light of the above-noted circumstances, an object of the present disclosure is to provide a chip resistor capable of preventing cracks in the solder between the wiring board and the back electrodes during the use of the chip resistor.

Means for Solving the Problems

In accordance with the present disclosure, there is provided a chip resistor that includes: a substrate having a top surface and a back surface facing away from each other in a thickness direction and a pair of side surfaces spaced apart from each other in one direction orthogonal to the thickness direction and connected to the top surface and the back surface; a pair of top electrodes spaced apart from each other in said one direction and held in contact with the top surface; a resistor element disposed on the top surface and connected to the pair of top electrodes; a pair of back electrodes spaced apart from each other in said one direction and held in contact with the back surface; and a pair of side electrodes held in contact with the pair of side surfaces and connected to the pair of top electrodes and the pair of back electrodes. Each of the back electrodes has a first layer in contact with the back surface and a second layer covering at least a part of the first layer, and the second layer is made of a material containing metal particles and synthetic resin.

The configuration and advantages of the present disclosure will become more apparent from the description given below based on the accompanying drawings.

MODE FOR CARRYING OUT THE INVENTION

Modes for carrying out the present disclosure are described below with reference to the accompanying drawings.

First Embodiment

A chip resistor A10 according to a first embodiment of the present disclosure is described below based on FIGS. 1-5.

Figure 2:
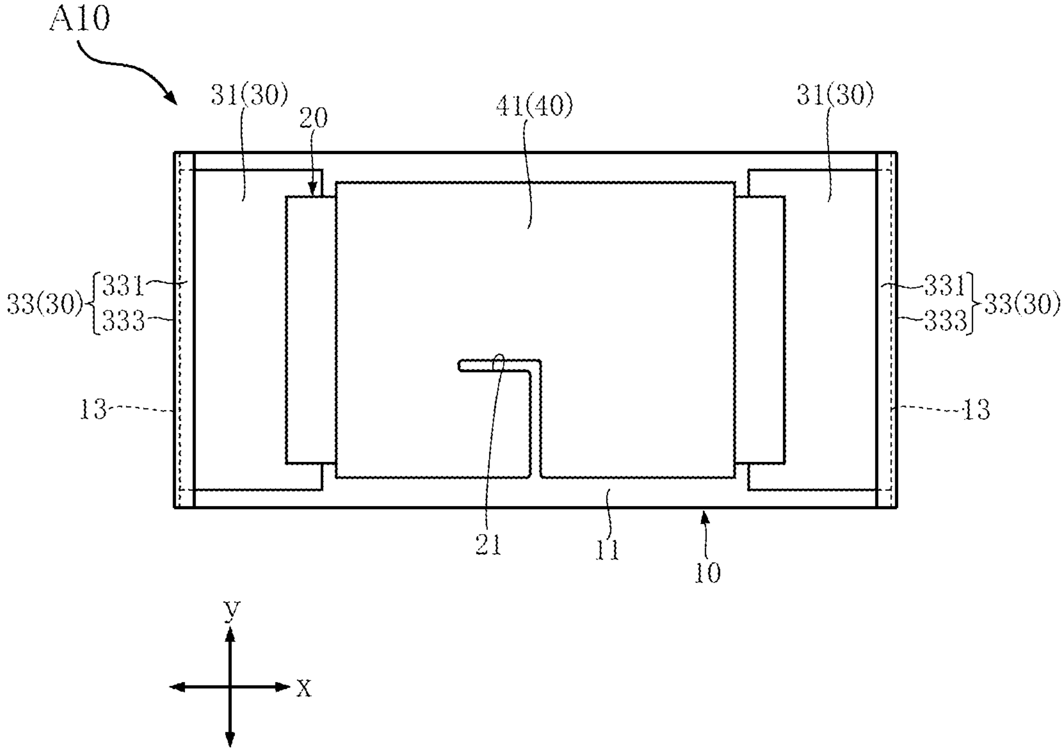
FIG. 2 is a plan view corresponding to FIG. 1, seen through a pair of external electrodes and an upper layer of a protective layer.
Figure 4:
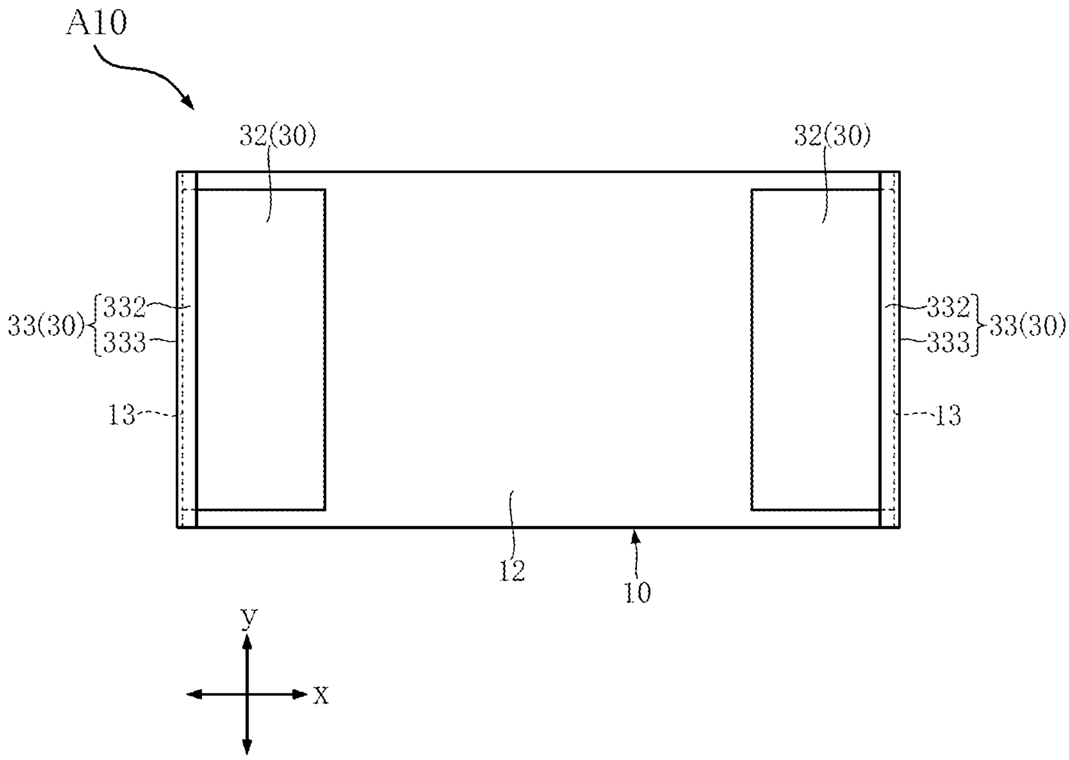
FIG. 4 is a bottom view corresponding to FIG. 3, seen through the pair of external electrodes.

The chip resistor A10 includes a substrate 10, a resistor element 20, a pair of electrodes 30 and a protective layer 40. For the convenience of understanding, FIG. 2 shows the structure seen through a pair of external electrodes 34 (described later) that form a part of the electrodes 30, and an upper layer 42 (described later) of the protective layer 40. Also, for the convenience of understanding, FIG. 4 shows the structure seen through the pair of external electrodes 34.

In the explanation of the chip resistor A10 and chip resistors A20-A40 described later, the thickness direction of the substrate 10 is referred to as "thickness direction z" for the convenience. Also, a direction orthogonal to the thickness direction z is referred to as "first direction x". The direction orthogonal to both of the thickness direction z and the first direction x is referred to as "second direction y".

Figure 1:
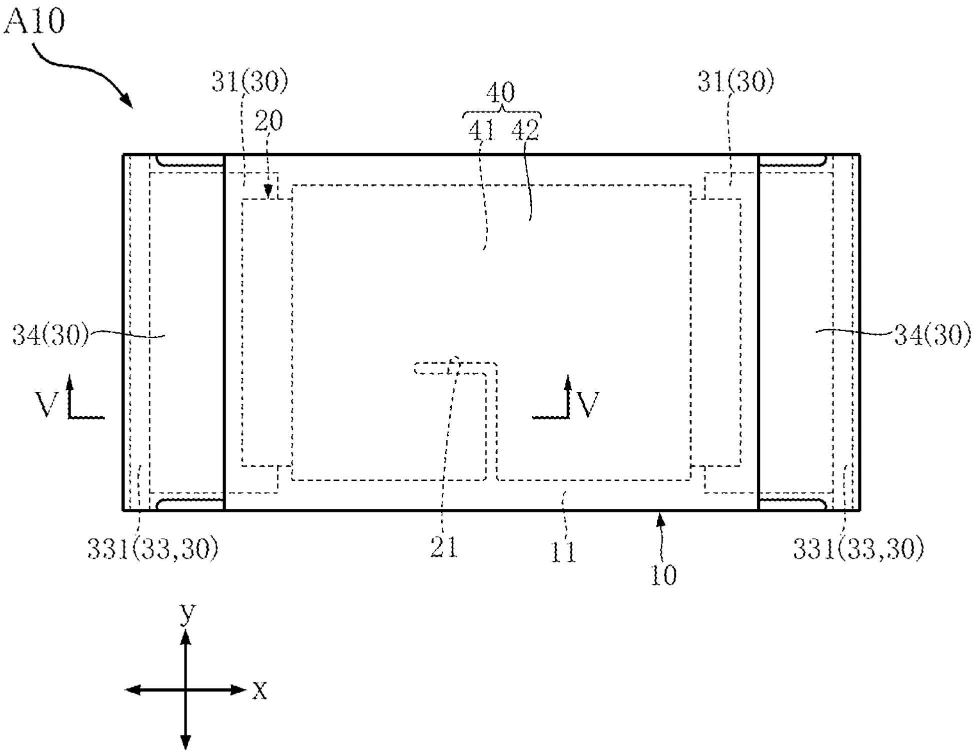
FIG. 1 is a plan view of a chip resistor according to a first embodiment of the present disclosure.

The chip resistor A10 can be surface-mounted on the wiring board of various electronic devices. The chip resistor A10 functions to limit the current flowing in the wiring board. The chip resistor A10 is of a thick-film (metal-glaze film) type. As shown in FIG. 1, the chip resistor A10 is rectangular as viewed in the thickness direction z. In this case, the first direction x corresponds to the longitudinal direction of the chip resistor A10. In other cases, as viewed in the thickness direction z, the chip resistor A10 may have a rectangular shape, with the longitudinal direction along the second direction y.

Figure 5:
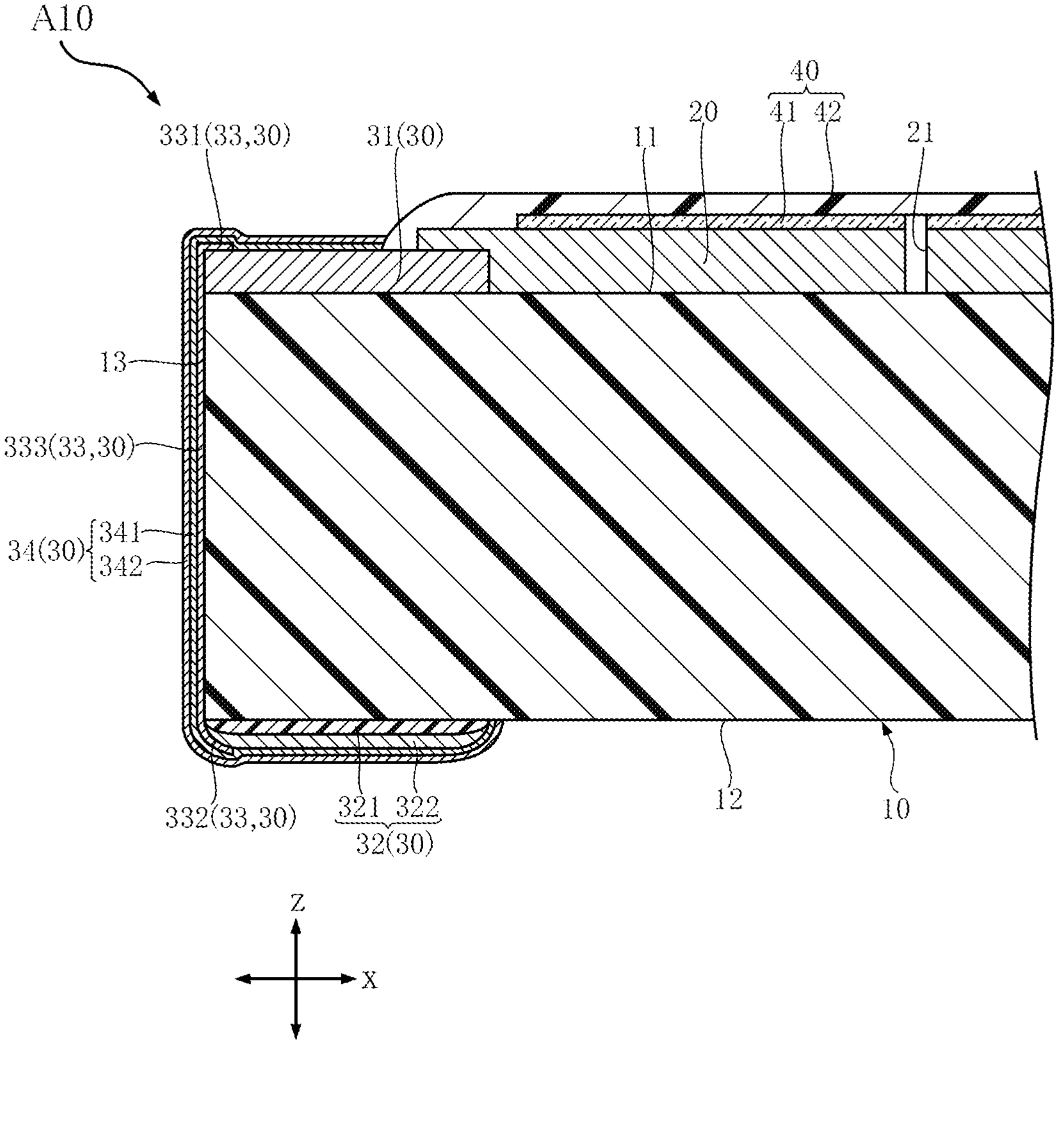
FIG. 5 is a sectional view taken along line V-V in FIG. 1.

As shown in FIGS. 1, 2 and 5, the resistor element 20, the pair of electrodes 30 and the protective layer 40 are disposed on the substrate 10. The substrate 10 has insulating properties. As viewed along the thickness direction, the substrate 10 has a rectangular shape, with the pair of sides extending along the first direction x being the longer sides. Since heat is generated from the resistor element 20 during the use of the chip resistor A10, the substrate 10 is required to have excellent heat dissipation. For this reason, it is desired that the material for the substrate 10 has a relatively high thermal conductivity. In the chip resistor A10, the substrate 10 is made of ceramics including alumina ($Al_2O_3$).

As shown in FIG. 5, the substrate 10 has a top surface 11, a back surface 12 and a pair of side surfaces 13. The top surface 11 and the back surface 12 face away from each other in the thickness direction z. The top surface 11 faces upward in FIG. 5. The back surface 12 faces downward in FIG. 5. When the chip resistor A10 is mounted on a wiring board, the back surface 12 faces the wiring board. The side surfaces 13 are connected to the top surface 11 and the back surface 12. As shown in FIGS. 2 and 4, the side surfaces 13 are spaced apart from each other in the first direction x.

As shown in FIGS. 1, 2 and 5, the resistor element 20 is disposed on the top surface 11 of the substrate 10. As viewed along the thickness direction z, the resistor element 20 is in the form of a strip extending in the first direction x. In the chip resistor A10, the resistor element 20 is made of a material containing metal particles and glass. The metal particles are, for example, ruthenium oxide ($RuO_2$) or silver (Ag)-palladium(Pd) alloy.

As shown in FIGS. 2 and 5, the resistor element 20 is formed with a trimming groove 21 penetrating in the thickness direction z. The trimming groove 21 is formed continuous through the resistor element 20 and a lower layer 41 (described later) of the protective layer 40 covering the resistor element 20. In the example of the chip resistor A10, the trimming groove 21 is L-shaped as viewed in the thickness direction z. One end of the resistor element 20 in the second direction y is gapped due to the presence of the trimming groove 21. The shape of the trimming groove 21 as viewed along the thickness direction z is not limited to the example of the chip resistor A10.

As shown in FIGS. 1-5, the electrodes 30 are disposed on the substrate 10, spaced apart from each other in the first direction x. The electrodes 30 are connected to the resistor element 20 at the opposite ends of the resistor element 20 in the first direction x. When the chip resistor A10 is mounted on a wiring board, the electrodes 30 are soldered to the wiring board. In this way, the electrodes form a conduction path between the resistor element 20 and the wiring board. As shown in FIG. 5, each of the electrodes 30 includes a top electrode 31, a back electrode 32, a side electrode 33 and an external electrode 34.

As shown in FIGS. 2 and 5, the paired top electrodes 31 are spaced apart from each other in the first direction x and in contact with the top surface 11 of the substrate 10. The upper electrodes 31 are connected to opposite ends of the resistor element 20 in the first direction x. Thus, the top electrodes 31 are electrically connected to the resistor element 20. Each of the top electrodes 31 is in the form of a strip extending in the second direction y. The top electrodes 31 are made of a material containing silver particles and glass.

As shown in FIGS. 4 and 5, the paired back electrodes 32 are spaced apart from each other in the first direction x and in contact with the back surface 12 of the substrate 10. Each of the back electrode 32 is in the form of a strip extending in the second direction y. As shown in FIG. 5, each of the back electrodes 32 has a first layer 321 and a second layer 322.

As shown in FIG. 5, each first layer 321 is in contact with the back surface 12 of the substrate 10. In the chip resistor A10, the first layer 321 is insulating and made of a material containing synthetic resin. The synthetic resin is epoxy resin, for example. In the chip resistor A10, each first layer 321 reaches the boundary between a relevant one of the side surfaces 13 and the back surface 12 of the substrate 10.

As shown in FIG. 5, the second layer 322 covers at least a part of the first layer 321. In the chip resistor A10, the second layer 322 covers the entirety of the first layer 321. The second layer 322 is made of a material containing metal particles and synthetic resin. Thus, the second layer 322 is electrically conductive. The metal particles contain silver. The synthetic resin is epoxy resin, for example.

As shown in FIGS. 2, 4 and 5, the pair of side electrodes 33 are in contact with the pair of side surfaces 13 of the substrate 10. The side electrodes 33 are connected to the top electrodes 31 and the back electrodes 32. Thus, the back electrodes 32 are electrically connected to the resistor element 20 via the side electrodes 33 and the top electrodes 31. In the chip resistor A10, the side electrodes 33 are made of a thin metal film. The thin metal film is made of an alloy containing nickel (Ni) and chromium (Cr).

As shown in FIG. 5, each of the side electrodes 33 has a top portion 331, a back portion 332 and a side portion 333. As shown in FIGS. 2 and 5, each of the top portions 331 overlaps with the top surface 11 of the substrate 10 as viewed in the thickness direction z and is in contact with a relevant one of the top electrodes 31. As shown in FIGS. 4 and 5, each of the back portions 332 overlaps with the back surface 12 of the substrate 10 as viewed in the thickness direction z and is in contact with the second layer 322 of the relevant one of the back electrodes 32. As shown in FIG. 5, each of the side portions 333 is in contact with a relevant one of the side surfaces 13 of the substrate 10 and a relevant one of the top electrodes 31. At opposite ends of each side portion 333 in the thickness direction z, the side portion 333 is connected to the top portion 331 and the back portion 332. In the chip resistor A10, each of the top portion 331, the back portion 332 and the side portion 333 has a uniform thickness.

Figure 3:
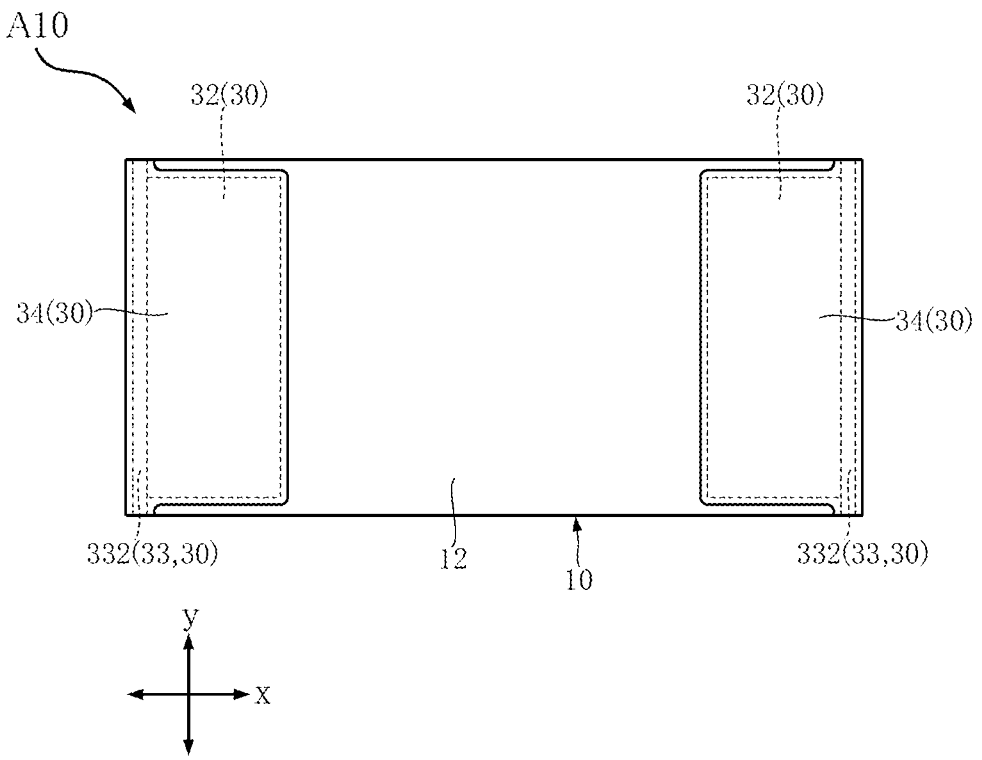
FIG. 3 is a bottom view of the chip resistor shown in FIG. 1.

As shown in FIGS. 1, 3 and 5, the pair of external electrodes 34 covers the pair of top electrodes 31, the pair of back electrodes 32 and the pair of side electrodes 33. Thus, the external electrodes 34 are electrically connected to the top electrodes 31, the back electrodes 32 and the side electrodes 33. The electrodes 30 are also electrically connected to the resistor element 20. The external electrodes 34 are made of a plating layer.

As shown in FIG. 5, each of the external electrodes has an intermediate portion 341 and an outer portion 342. Each of the intermediate portions 341 covers a relevant one of the top electrodes 31, the back electrode 32 overlapping with the top electrode 31 as viewed in the thickness direction, and the side electrode connected to the top electrode 31 and the back electrode 32. The intermediate portions 341 contain nickel. The outer portions 342 cover the intermediate portions 341. The outer portions 342 contain tin (Sn).

As shown in FIGS. 1 and 5, the protective layer 40 covers the resistor element 20. The protective layer 40 has a lower layer 41 and an upper layer 42.

As shown in FIGS. 2 and 5, the lower layer 41 covers a part of the resistor element 20. The resistor element 20 projects in the first direction x from the opposite ends of lower layer 41 in the first direction x. The lower layer 41 is formed with the above-noted trimming groove 21. The lower layer 41 is made of a material containing glass.

As shown in FIGS. 1 and 5, the upper layer 42 covers a part of the resistor element 20 and the lower layer 41. The upper layer 42 also covers a part of the top surface 11 of the substrate 10 and a part of each top electrode 31. The upper layer 42 is made of a material containing black epoxy resin, for example.

A Variation of the First Embodiment

A chip resistor A11, which is a variation of the chip resistor A10, is described below based on FIG. 6.

The chip resistor A11 differs from the chip resistor A10 in configuration of the side electrodes 33.

Figure 6:
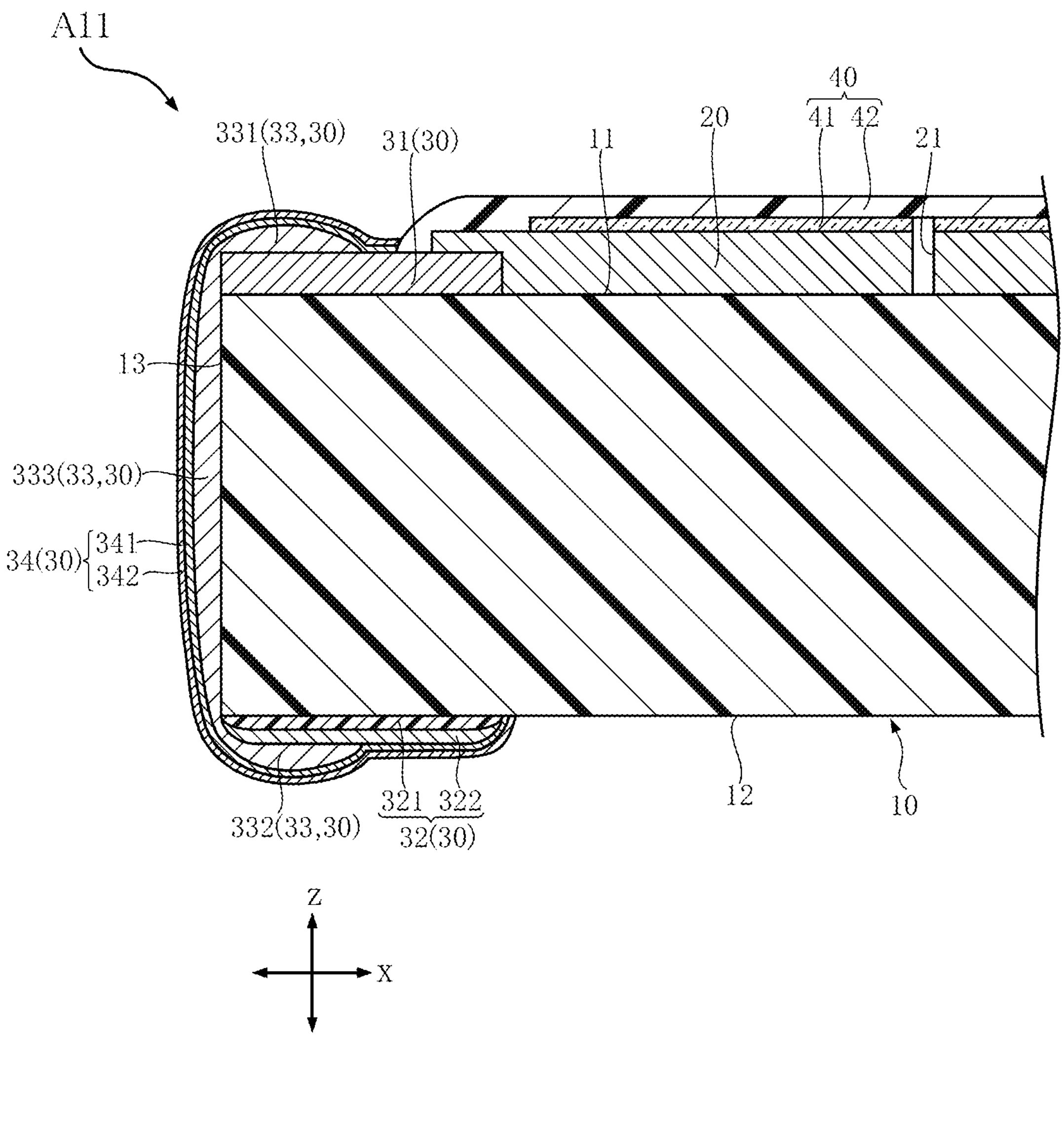
FIG. 6 is a sectional view of a chip resistor according to a variation of the first embodiment of the present disclosure.

As shown in FIG. 6, in the chip resistor A11, the top portion 331 of each side electrode 33 bulges in the thickness direction z from the surface of the relevant top electrode 31. The back portion 332 of each side electrode 33 bulges in the thickness direction z from the surface of the second layer 322 of the relevant back electrode 32. The side portion 333 of each side electrode 33 bulges in the first direction x from the relevant side surface 13 of the substrate 10. In the chip resistor A11, the side electrodes 33 are made of a material containing silver particles and synthetic resin. The synthetic resin is epoxy resin, for example.

Figure 16:
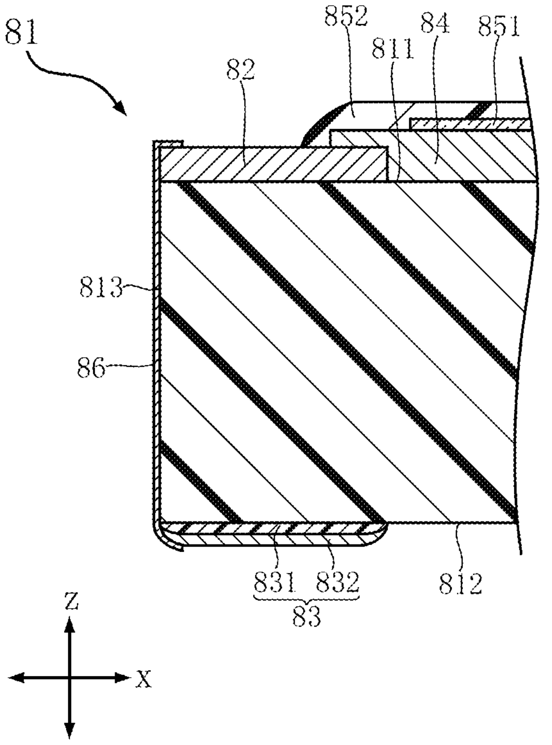
FIG. 16 is a sectional view for describing the method for manufacturing the chip resistor shown in FIG. 1.

An example of a method for manufacturing the chip resistor A10 is described below based on FIGS. 7-18. Note that FIGS. 16 and 18 are sectional views taken along the same plane as FIG. 15.

Figure 7:
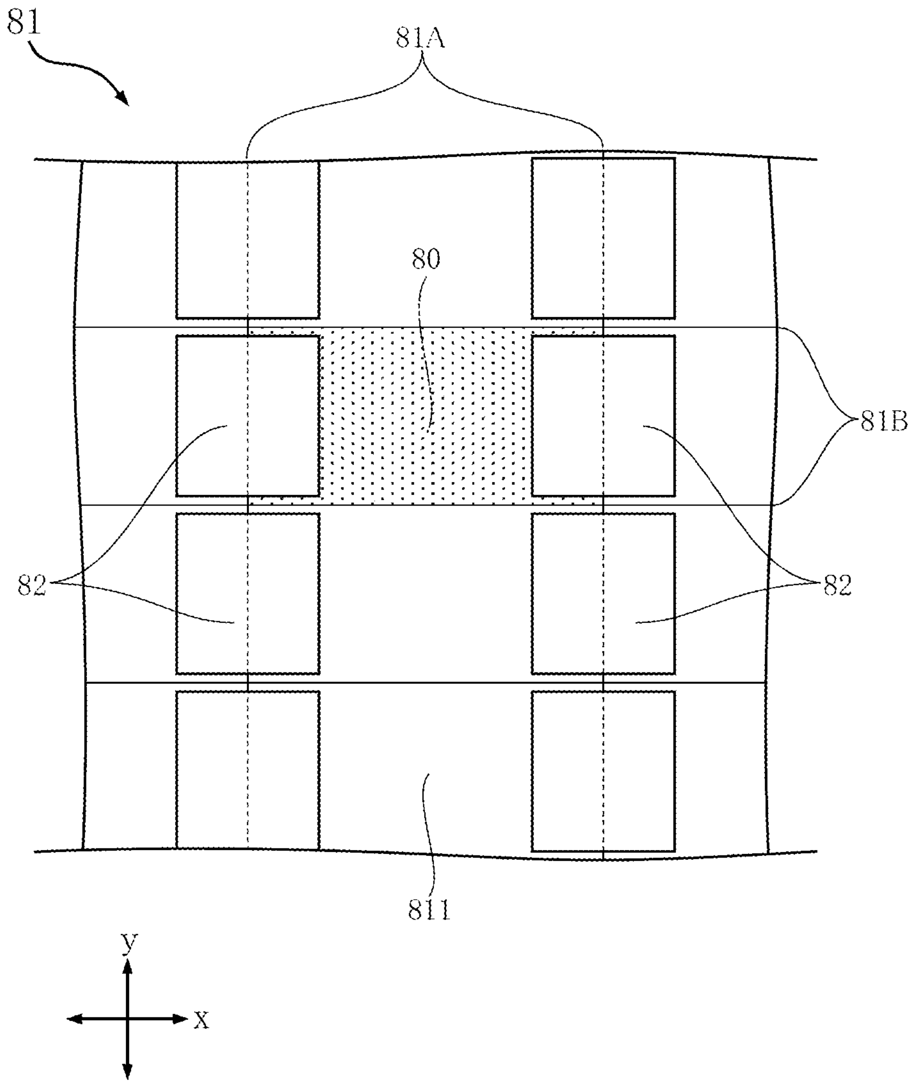
FIG. 7 is a bottom view for describing a method for manufacturing the chip resistor shown in FIG. 1.

First, a sheet-shaped base material 81 having a top surface 811 and a back surface 812 facing away from each other in the thickness direction z is prepared, on which a plurality of top electrodes 82 are formed in contact with the top surface 811, as shown in FIG. 7. The top surface 811 is provided with a plurality of primary grooves 81A extending in the second direction y and a plurality of secondary grooves 81B extending in the first direction x. The primary grooves 81A and the secondary grooves 81B are both recessed from the top surface 811 in the thickness direction z. The back surface 812 is also provided a plurality of primary grooves 81A and a plurality of secondary grooves 81B. The formation positions of the primary grooves 81A and the secondary grooves 81B on the back surface 812 correspond to the formation positions of the primary grooves 81A and the secondary grooves 81B on the top surface 811, respectively. On the top surface 811 and the back surface 812, the primary grooves 81A and the secondary grooves 81B define a plurality of regions 80, each of which corresponds to the substrate 10 of a chip resistor A10.

As shown in FIG. 7, the top electrodes 82 are formed individually on each of the regions 80 on the top surface 811 of the base material 81 to be spaced apart from each other in the first direction x. Each of the top electrodes 82 is formed to extend across one of the primary grooves 81A. In this way, on each of the regions 80, a pair of top electrodes 82 each spanning one of the paired primary grooves 81A defining the region is formed. The pair of top electrodes 82 corresponds to the pair of top electrodes 31 of the chip resistor A10. The top electrodes 82 are formed by printing a paste containing silver particles and glass frit on the top surface 811 and then baking the paste.

Figure 8:
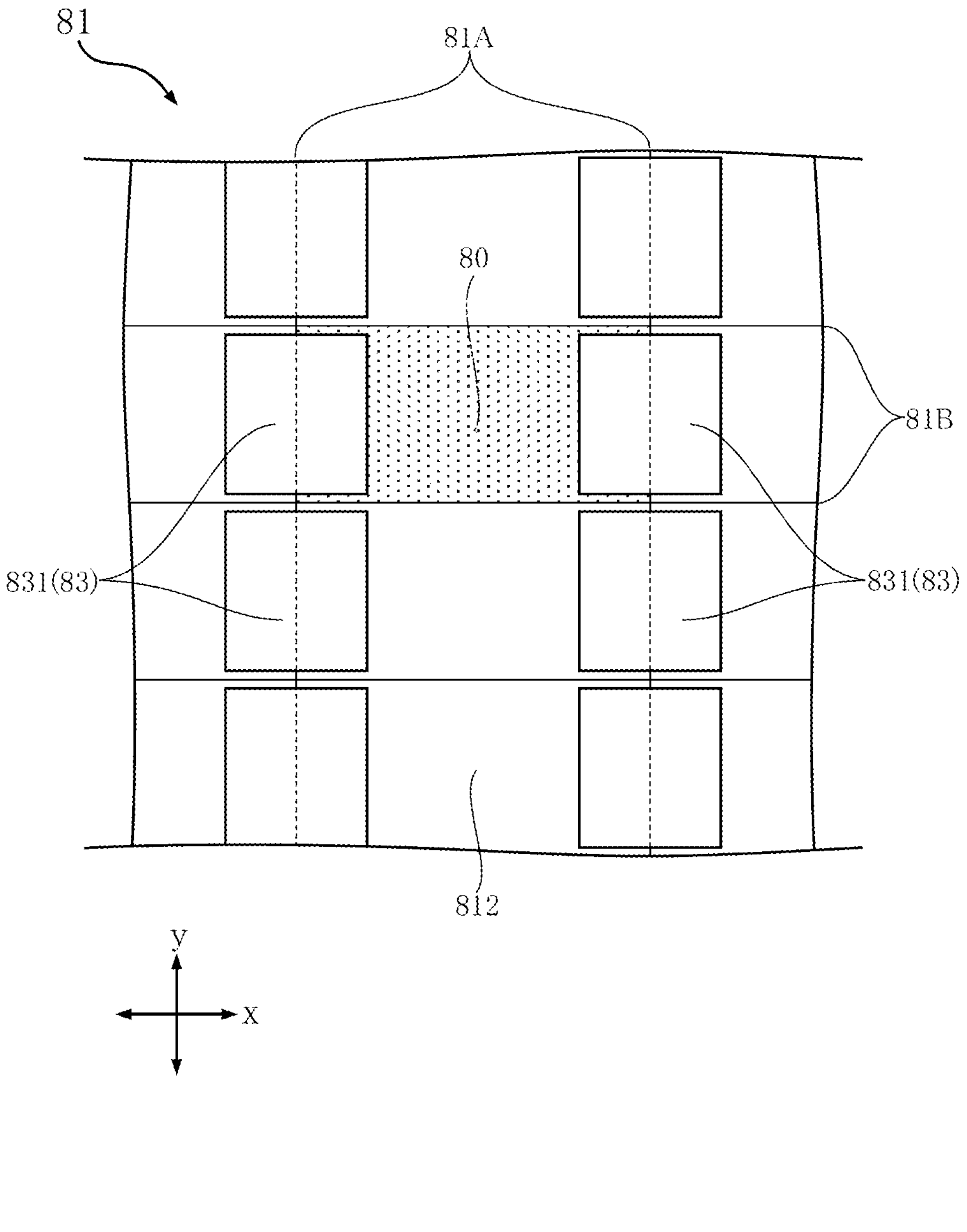
FIG. 8 is a bottom view for describing the method for manufacturing the chip resistor shown in FIG. 1.
Figure 9:
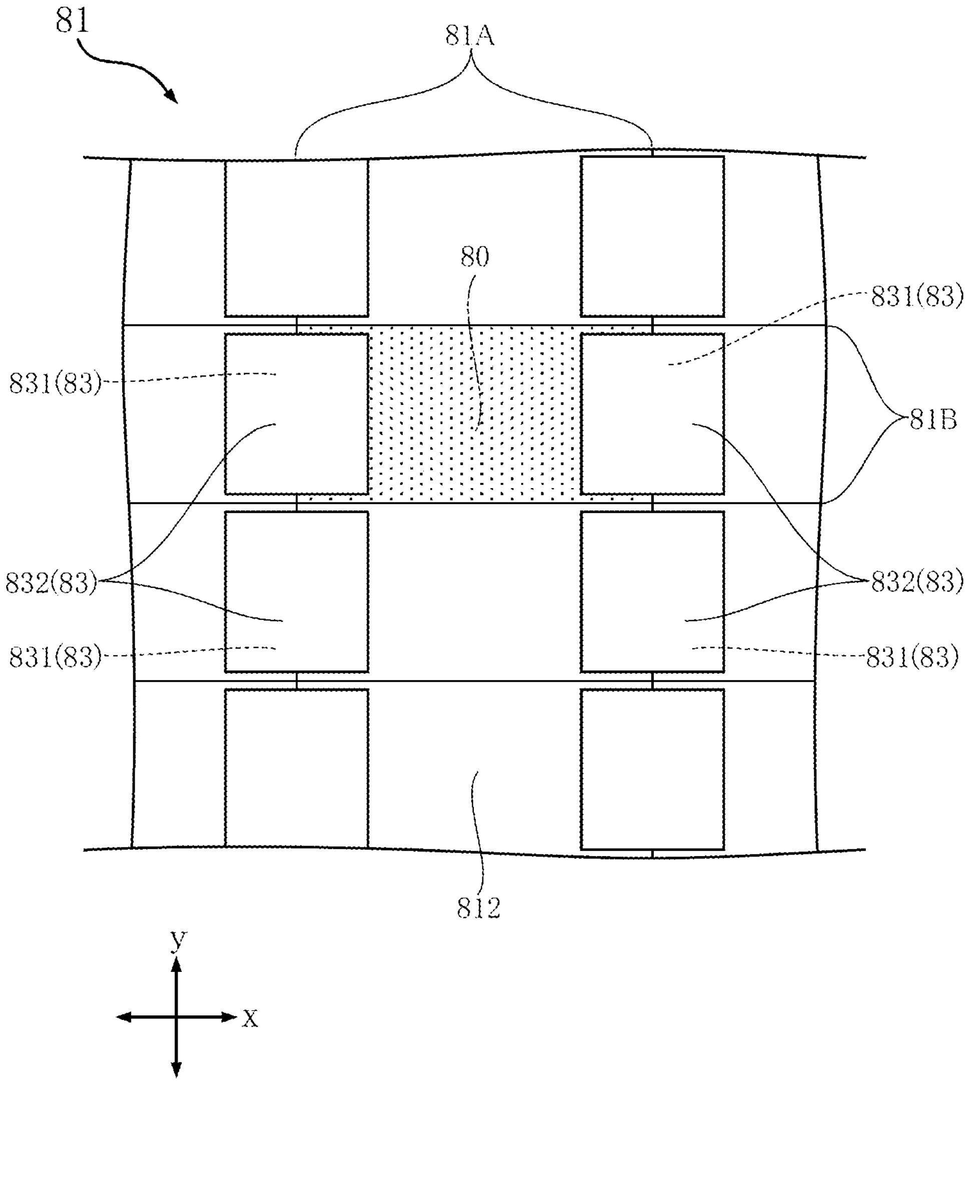
FIG. 9 is a plan view for describing the method for manufacturing the chip resistor shown in FIG. 1.

Next, as shown in FIGS. 8 and 9, a plurality of back electrodes 83 are formed in contact with the back surface 812 of the base material 81. The back electrodes 83 are formed individually on each of the regions 80 on the back surface 812 to be spaced apart from each other in the first direction x. Each of the back electrodes 83 is constituted by a first layer 831 and a second layer 832. First, as shown in FIG. 8, a plurality of first layers 831 are formed such that each first layer spans one of the primary grooves 81A. The first layers 831 are formed by printing a paste mainly composed of epoxy resin on the back surface 812 and then heat-curing the paste.

Next, as shown in FIG. 9, a plurality of second layers 832 are formed to individually cover the plurality of first layers 831. The second layers 832 are formed such that each second layer covers the entirety of the relevant first layer 831. In this way, on each of the regions 80, a pair of first layers 831 and a pair of second layers 832, each spanning one of the paired primary grooves 81A defining the region, are formed. The pair of first layers 831 and the pair of second layers 832 correspond to the pair of back electrodes 32 of the chip resistor A10. The second layers 832 are formed by individually printing a paste mainly composed of epoxy resin and containing silver particles on each of the first layers 831 and then heat-curing the paste. In this way, the back electrodes 83 are formed.

Figure 10:
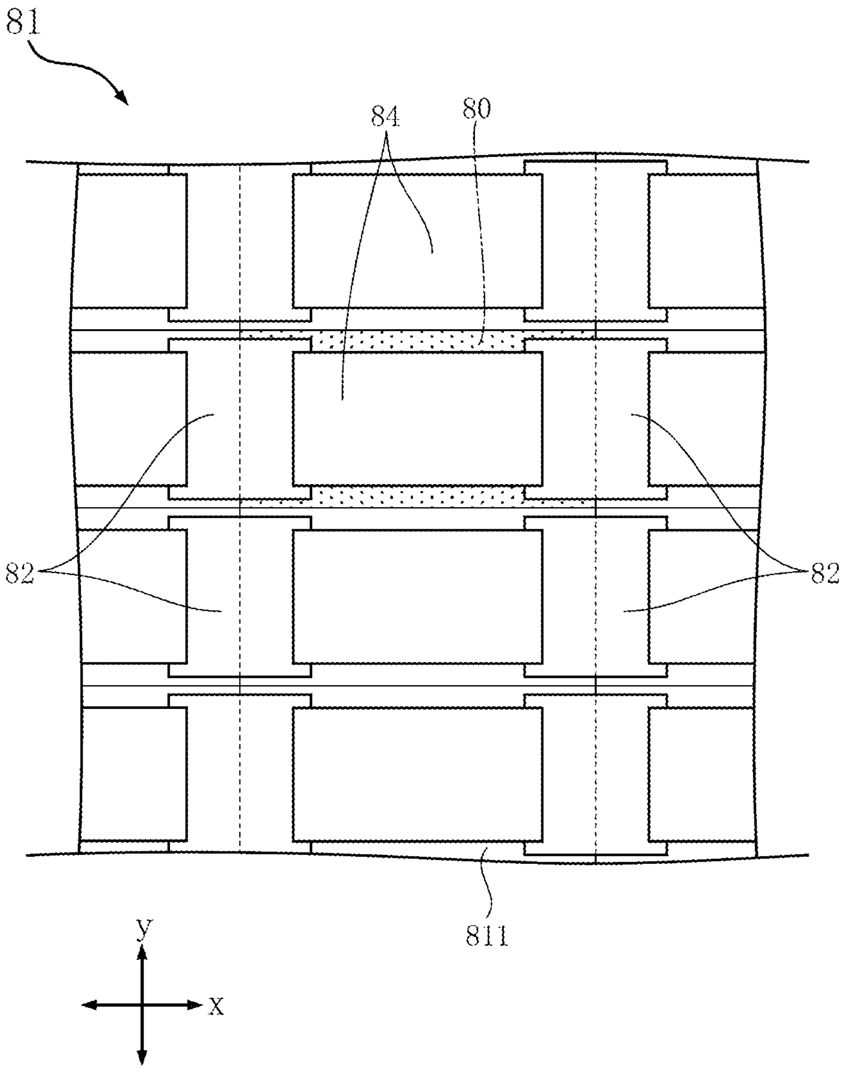
FIG. 10 is a plan view for describing the method for manufacturing the chip resistor shown in FIG. 1.

Next, as shown in FIG. 10, a plurality of resistor elements 84 are formed in contact with the top surface 811 of the base material 81. The resistor elements 84 are formed individually on the regions 80 on the top surface 811. The resistor element 84 on each of the regions 80 corresponds to the resistor element 20 of the chip resistor A10. On each of the regions 80, opposite ends of the resistor element 84 in the first direction x are in contact with the top electrodes 82. The resistor elements 84 are formed by printing a paste containing silver particles and glass frit on the top surface 811 and then baking the paste. The metal particles are, for example, ruthenium oxide or silver-palladium alloy.

Figure 11:
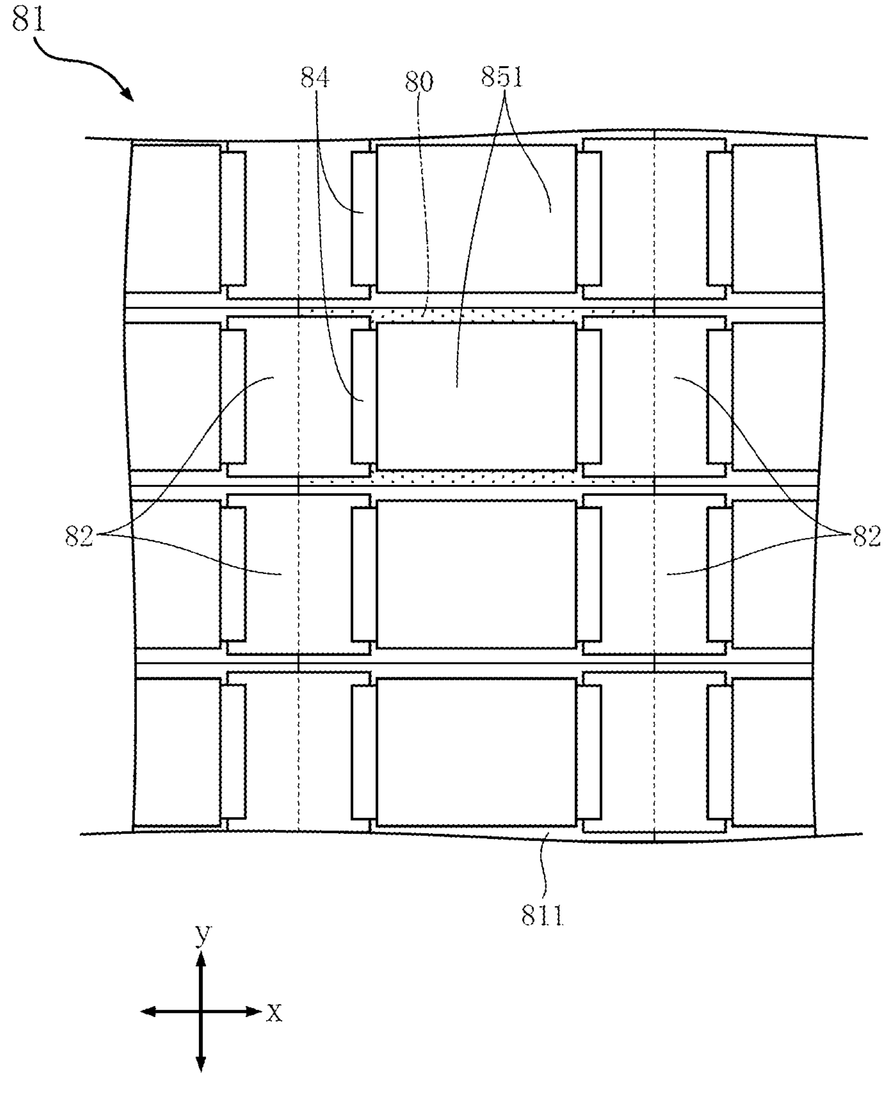
FIG. 11 is a plan view for describing the method for manufacturing the chip resistor shown in FIG. 1.

Next, as shown in FIG. 11, a plurality of lower layers 851 individually covering the resistor elements 84 are formed. Each of the lower layers 851 corresponds to the lower layer 41 of the protective layer 40 of the chip resistor A10. The lower layers 851 are formed by individually printing a glass paste on each of the resistor elements 84 and then baking the glass paste.

Figure 12:
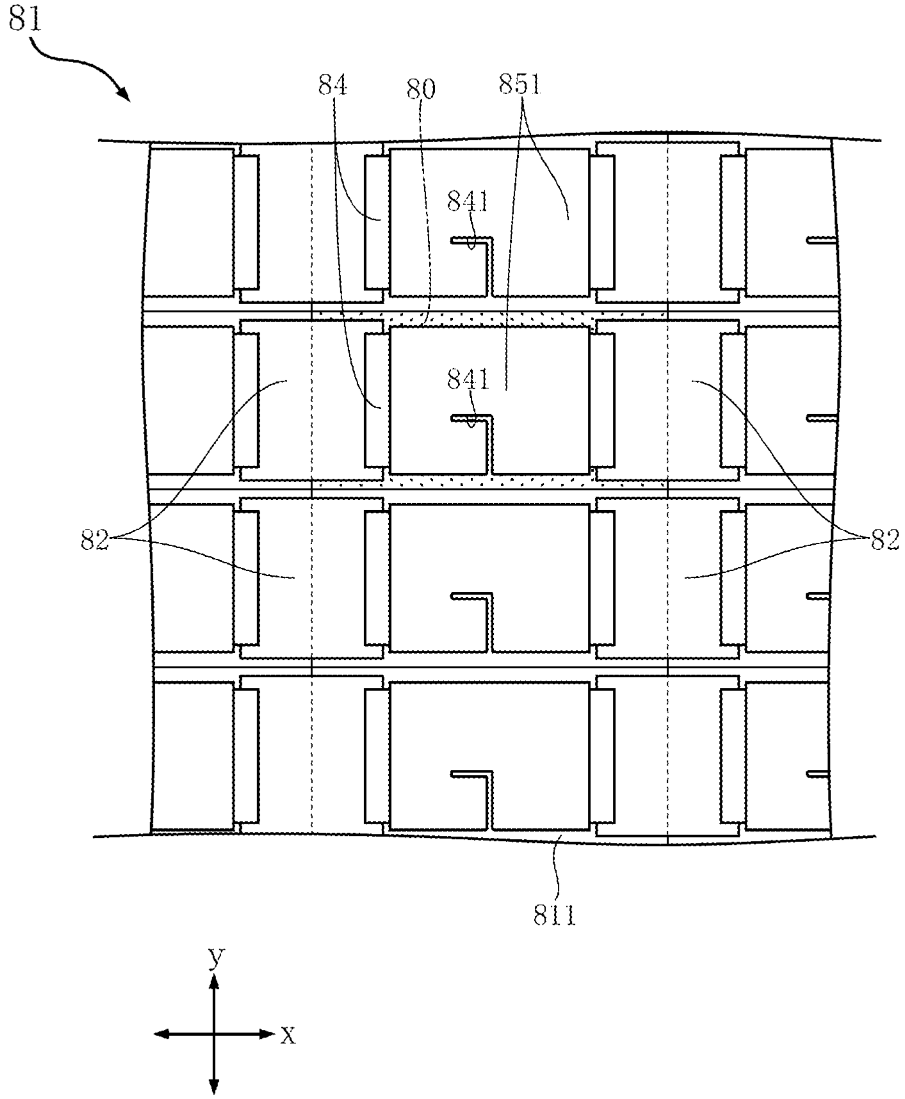
FIG. 12 is a plan view for describing the method for manufacturing the chip resistor shown in FIG. 1.

Next, as shown in FIG. 12, a plurality of trimming grooves 841 penetrating in the thickness direction z are formed in the resistor elements 84 and the lower layers 851. Each of the trimming grooves 841 corresponds to the trimming groove 21 of the chip resistor A10. The trimming grooves 841 are formed with a laser trimming apparatus.

Each of the trimming grooves 841 is formed by the following procedure. First, a probe for resistance measurement is brought into contact with opposite ends in the first direction x of the resistor element 84, which is the target for forming the trimming groove 841. Next, a groove penetrating the resistor element 84 and the lower layer 851 in the thickness direction z is formed along the second direction y from one end of the resistor element 84 in the second direction y. After the groove is formed until the resistance of the resistor element 84 becomes close to a predetermined value (the resistance value of the chip resistor A10), another groove, starting from the termination point of the first groove, is formed along the first direction x. When the resistance of the resistor element 84 reaches the predetermined value, the formation of the groove is completed. In this way, the trimming grooves 841 are formed.

Figure 13:
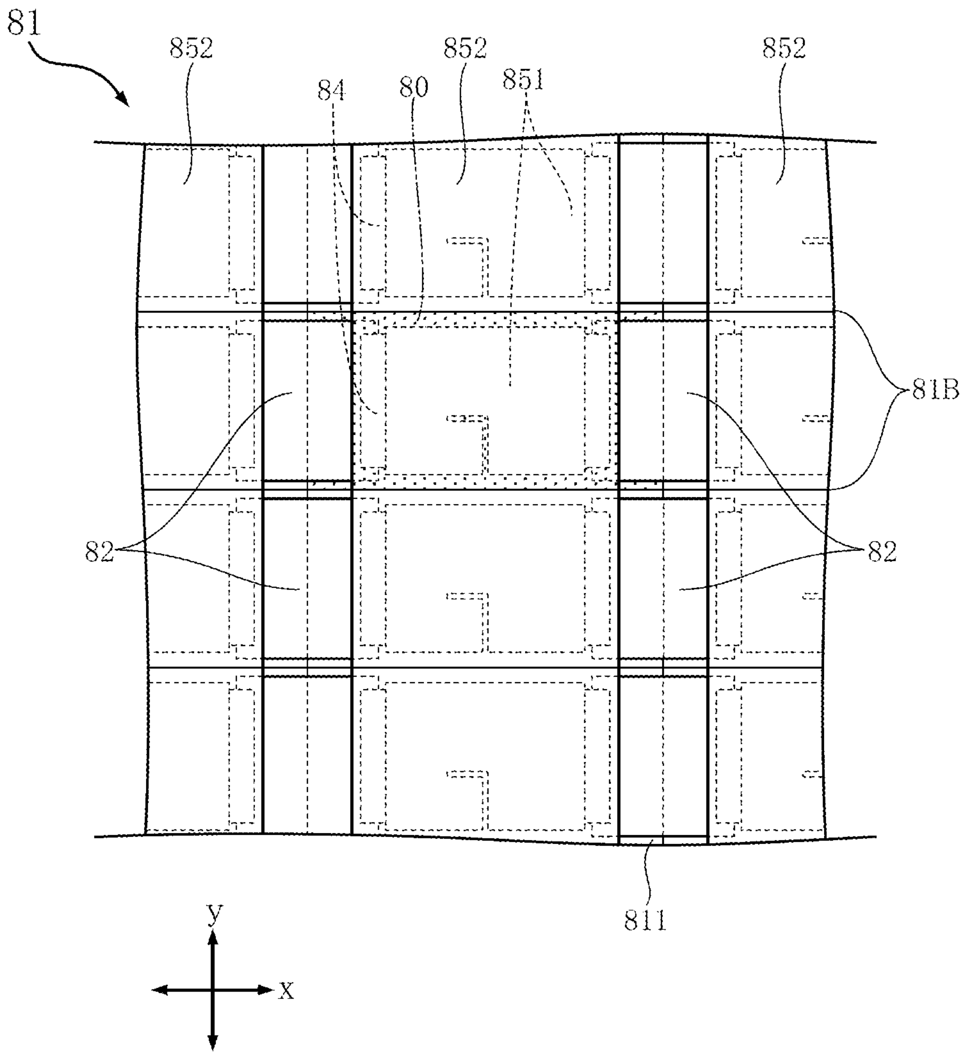
FIG. 13 is a plan view for describing the method for manufacturing the chip resistor shown in FIG. 1.

Next, as shown in FIG. 13, a plurality of upper layers 852 covering the resistor elements 84, the lower layers 851 and a part of each top electrodes 82 are formed. The upper layers 852 are formed to be spaced apart from each other in the first direction x and to form strips extending in the second direction y. The upper layers 852 span the secondary grooves 81B formed on the top surface 811 of the base material 81. A part of the upper layer 852 on each of the regions 80 on the top surface 811 corresponds to the upper layer 42 of the protective layer 40 of the chip resistor A10. The upper layers 852 are formed by printing a paste mainly composed of epoxy resin to integrally cover the resistor elements 84 and the lower layers 851 and then heat-curing the paste.

Figure 14:
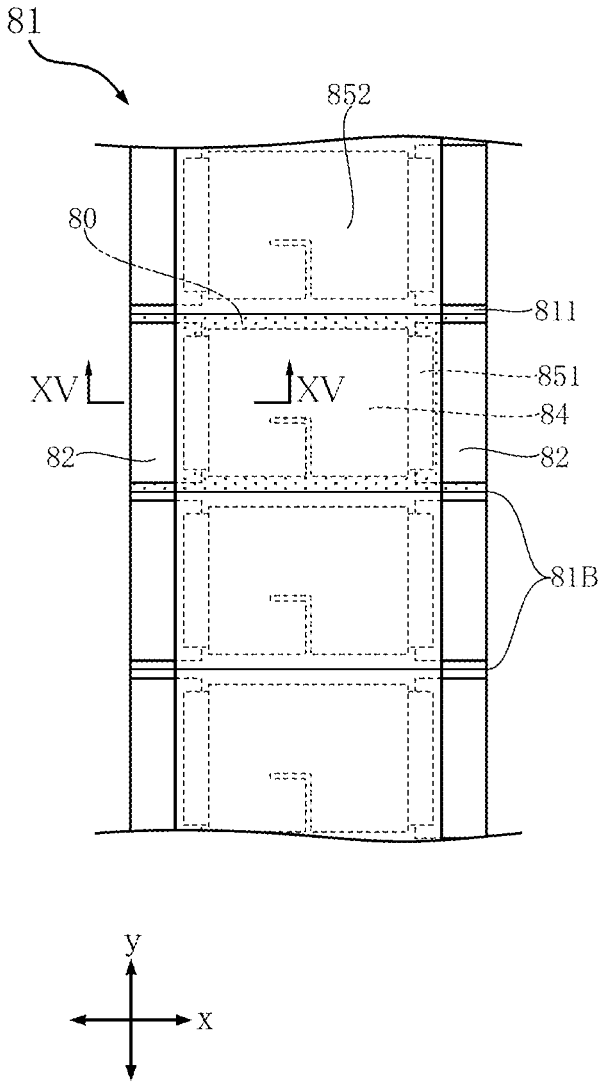
FIG. 14 is a plan view for describing the method for manufacturing the chip resistor shown in FIG. 1.
Figure 15:
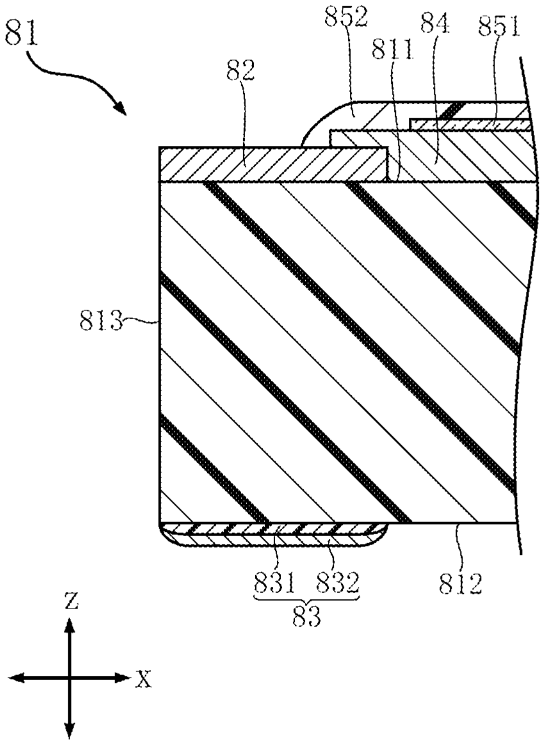
FIG. 15 is a sectional view taken along line XV-XV in FIG. 14.

Next, as shown in FIG. 14, the base material 81 is divided along the primary grooves 81A. Thus, a plurality of base materials 81 in the form of strips extending in the second direction y are obtained. By this step, a pair of side surfaces 813 appear on the opposite ends of each base material 81 in the first direction x. The side surfaces 813 face in the first direction x.

Next, as shown in FIG. 16, a pair of side electrodes 86 are formed in contact with the pair of side surfaces 813 of the base material 81. The side electrodes 86 are formed to also come into contact with the top electrodes 82 and the second layers 832 of the back electrodes 83. The side electrodes 86 are made by forming a film of nickel-chromium alloy by sputtering on the side surfaces 813, a part of each top electrode 82 and a part of each back electrode 83.

Figure 17:
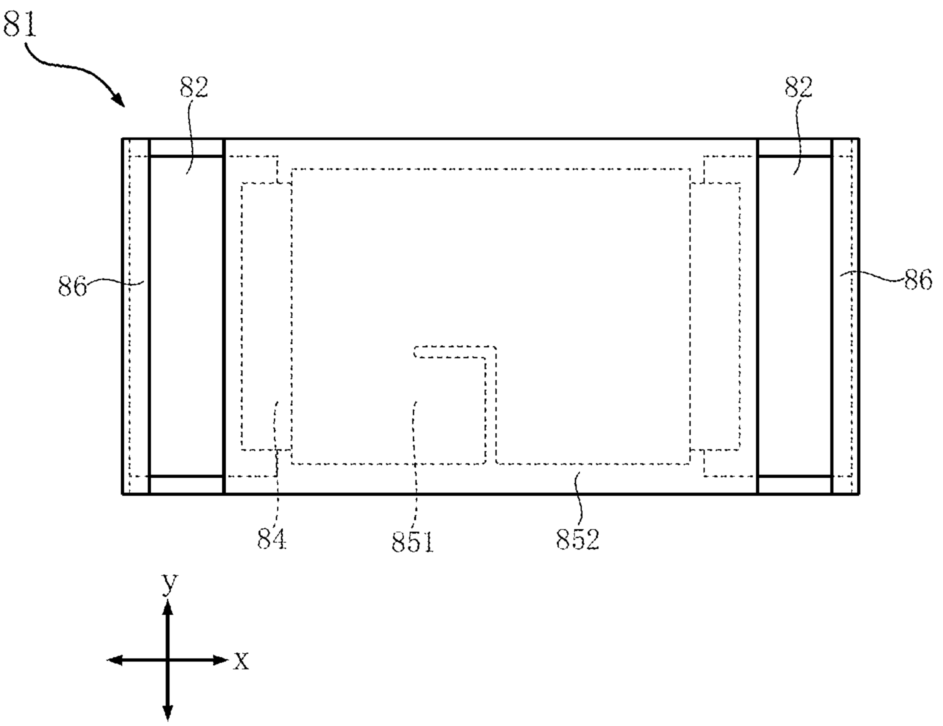
FIG. 17 is a plan view for describing the method for manufacturing the chip resistor shown in FIG. 1.
Figure 18:
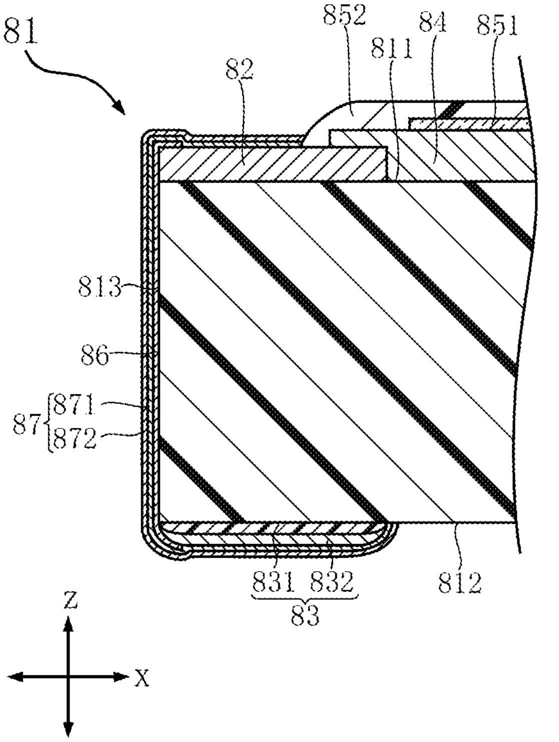
FIG. 18 is a sectional view for describing the method for manufacturing the chip resistor shown in FIG. 1.

Next, as shown in FIG. 17, the base material 81 is divided along the secondary grooves 81B. Thus, a plurality of individual pieces of the base material 81 are obtained. Each individual piece of the base material 81 corresponds to the substrate 10 of the chip resistor A10. Each individual piece of the base material 81 has a pair of top electrodes 82, a pair of back electrodes 83, a resistor element 84, a lower layer 851, an upper layer 852 and a pair of side electrodes 86 formed thereon.

Finally, as shown in FIG. 18, a pair of external electrodes 87 are formed to individually cover the pair of top electrodes 82, the pair of back electrodes 83 and the pair of side electrodes 86 on the base material 81 in the form of an individual piece. The pair of external electrodes 87 corresponds to the pair of external electrodes 34 of the chip resistor A10. Each of the external electrodes 87 is constituted by an intermediate portion 871 and an outer portion 872. The intermediate portion 871 corresponds to the intermediate portion 341 of each external electrode 34 of the chip resistor A10. The outer portion 872 corresponds to the outer portion 342 of each external electrode 34 of the chip resistor A10.

Each of the intermediate portion 871 and the outer portion 872 is formed by electrolytic barrel plating. The intermediate portion 871 is formed by depositing nickel on the top electrode 82, the back electrode 83 and the side electrode 86 exposed on the base material 81. The outer portion 872 is formed by depositing tin on the intermediate portion 871. By going through the above process, the chip resistor A10 is manufactured.

The advantages of the chip resistor A10 are described below.

In the chip resistor A10, each of the back electrodes 32 has a first layer 321 and a second layer 322. The first layer 321 is in contact with the back surface 12 of the substrate 10. The second layer 322 covers at least a part of the first layer 321. The second layer 322 is made of a material containing metal particles and synthetic resin. When the chip resistor A10 is mounted on the wiring board, in each of the back electrodes 32, the second layer 322 is located closer to the solder than is the first layer 321. The Young's modulus of the second layer 322 is relatively small as compared with that of back electrodes 32 made of a material containing glass and metal particles. This reduces the thermal stress generated in the solder during the use of the chip resistor A10. Thus, the chip resistor A10 can prevent the solder between the wiring board and the back electrodes 32 from cracking during the use of the chip resistor A10.

In the chip resistor A10, the first layer 321 of each back electrode 32 is insulating and made of a material containing synthetic resin. The second layer 322 of each back electrode 32 covers the entirety of the relevant first layer 321. By making each of the back electrodes 32 have a two-layer structure consisting of a first layer 321 and a second layer 322 both containing synthetic resin, adhesion of the back electrodes 32 to the back surface 12 of the substrate 10 is enhanced, and deterioration of the tensile strength of the back electrodes 32 is prevented, while the thermal stress generated in the solder is reduced.

In each of the back electrode 32 of the chip resistor A10, though the first layer 321 is insulating, the second layer 322, which covers the entirety of the first layer 321, is electrically conductive. Thus, in the step of forming the external electrodes 87 shown in FIG. 18, the external electrodes 87 can be so formed as to cover the entirety of the respective back electrodes 83.

In the chip resistor A10, the side electrodes 33 are made of a thin metal film. Thus, the thickness of each side electrode 33 can be made smaller than that of each side electrode 33 made of a material containing silver particles and synthetic resin as in the chip resistor A11.

The chip resistor A10 also includes the external electrodes 34 covering the top electrodes 31, the back electrodes 32 and the side electrodes 33. The external electrodes 34 are made of a plating layer. Each of the external electrodes 34 has an intermediate portion 341 containing nickel and an outer portion 342 covering the intermediate portion 341 and containing tin. With such an arrangement, in mounting the chip resistor A10 on a wiring board, the solder and the outer portion 342 are combined to form an alloy, thereby improving the mounting properties of the chip resistor A10 to the wiring board. Moreover, in mounting the chip resistor A10 on a wiring board, the intermediate portions 341 mitigate the thermal shock caused by e.g. solder, so that the top electrodes 31, the back electrodes 32 and the side electrodes 33 are protected against such thermal shock.

Second Embodiment

A chip resistor A20 according to a second embodiment of the present disclosure is described below based on FIGS. 19 and 20. In these figures, the elements that are identical or similar to those of the chip resistor A10 are denoted by the same reference signs as those used for the chip resistor A10 and are not described. Note that FIG. 19 is a sectional view taken along the same plane as FIG. 5.

The chip resistor A20 differs from the chip resistor A10 in configuration of the back electrodes 32.

Figure 19:
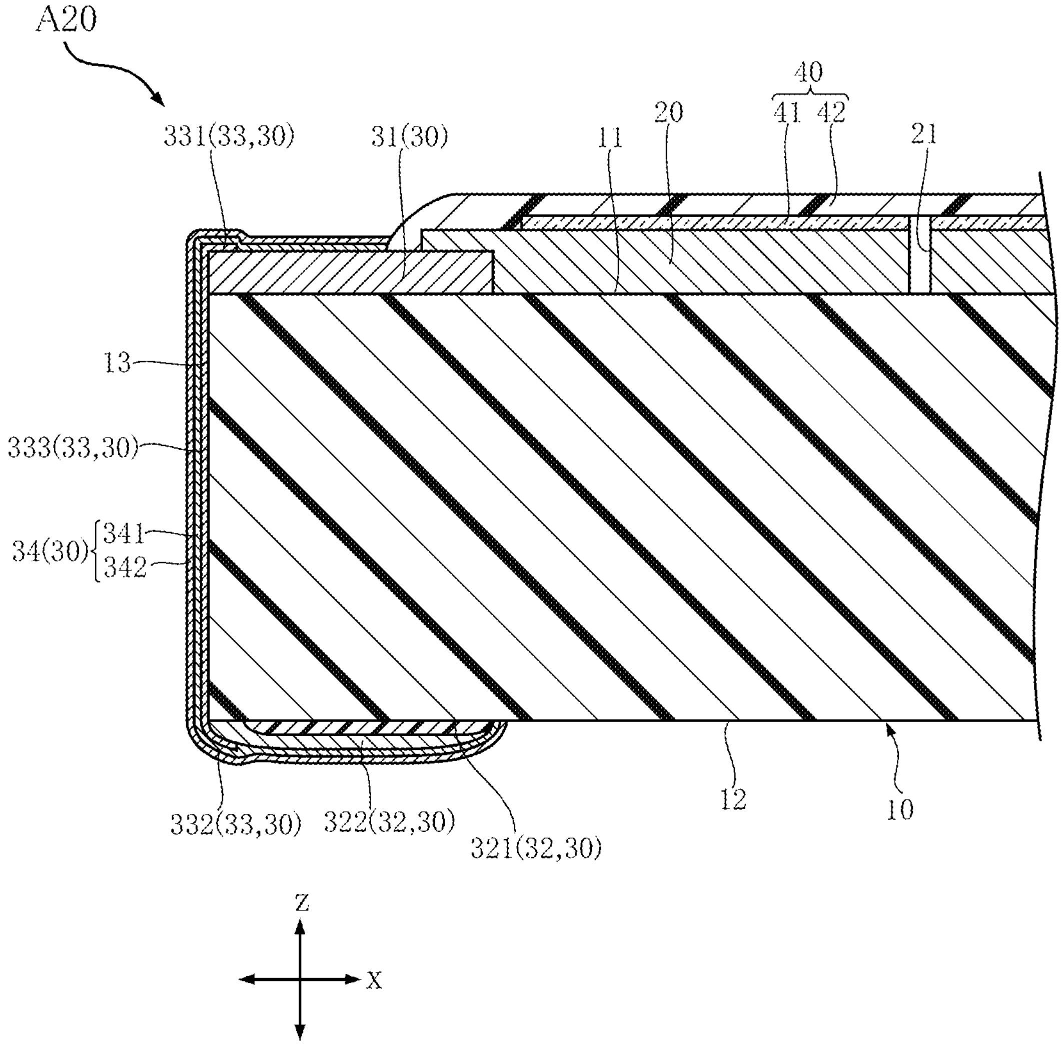
FIG. 19 is a sectional view of a chip resistor according to a second embodiment of the present disclosure.
Figure 20:
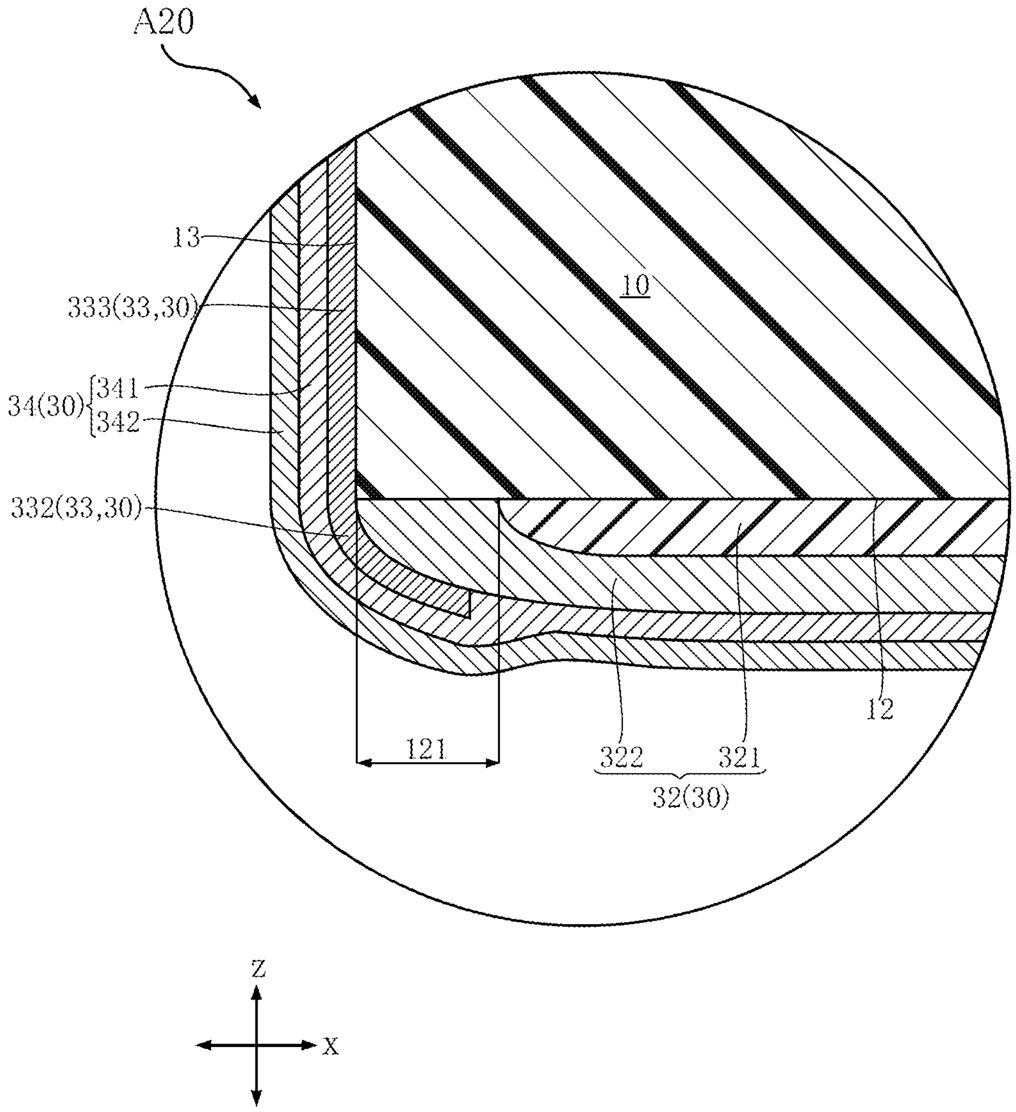
FIG. 20 is an enlarged sectional view showing a part of FIG. 19.

As shown in FIGS. 19 and 20, each first layer 321 is spaced apart from the boundary between the relevant side surface 13 and the back surface 12 of the substrate 10 in the first direction x. Thus, as shown in FIG. 20, the back surface 12 has a region 121 located between the boundary of the side surface 13 and the back surface 12 and the first layer 321. The second layer 322 of each back electrode 32 is in contact with the region 121 of the back surface 12 of the substrate 10.

The advantages of the chip resistor A20 are described below.

In the chip resistor A20, each of the back electrodes 32 has a first layer 321 and a second layer 322. The first layer 321 is in contact with the back surface 12 of the substrate 10. The second layer 322 covers at least a part of the first layer 321. The second layer 322 is made of a material containing metal particles and synthetic resin. Thus, the chip resistor A20 can also prevent the solder between the wiring board and the back electrodes 32 from cracking during the use of the chip resistor A20.

In the chip resistor A20, the first layer 321 of each back electrode 32 is spaced apart from the boundary between the relevant side surface 13 and the back surface 12 of the substrate 10 in the first direction x. The second layer 322 of each back electrode 32 is in contact with the region 121 between the boundary of the side surface 13 and the back surface 12 and the first layer 321. It is known that the thermal stress generated in the solder during the use of the chip resistor A20 particularly concentrates on the boundary between each side surface 13 and the back surface 12 of the substrate 10. According to the present embodiment, it is possible to increase the thickness of the first layer 321 without affecting the process of dividing the base material 81 shown in FIGS. 14 and 15, while reliably reducing the thermal stress generated in the solder.

Third Embodiment

Figure 21:
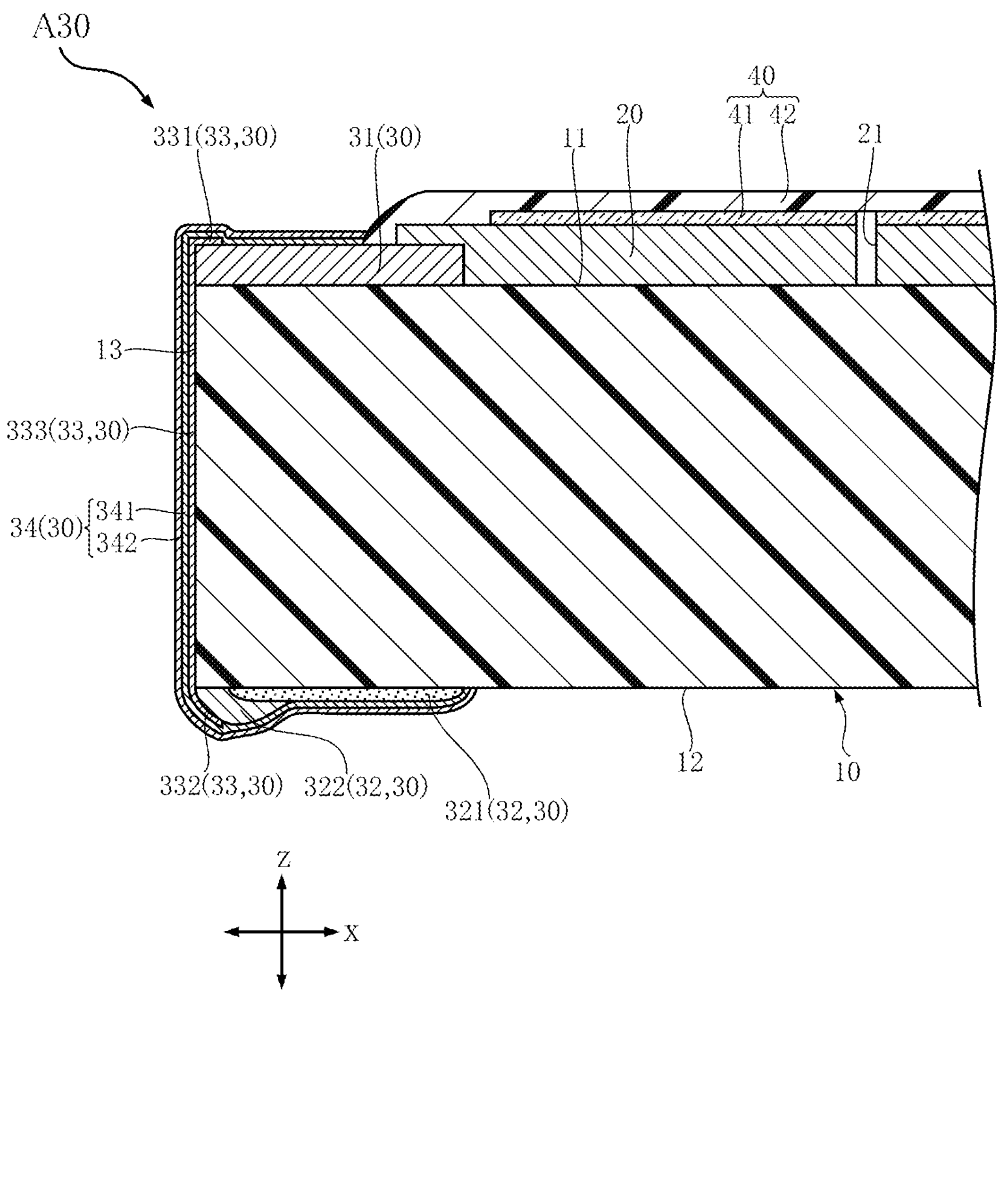
FIG. 21 is a sectional view of a chip resistor according to a third embodiment of the present disclosure.

A chip resistor A30 according to a third embodiment of the present disclosure is described below based on FIGS. 21 and 22. In these figures, the elements that are identical or similar to those of the chip resistor A10 are denoted by the same reference signs as those used for the chip resistor A10 and are not described. Note that FIG. 21 is a sectional view taken along the same plane as FIG. 5.

The chip resistor A30 differs from the chip resistor A10 in configuration of the back electrodes 32.

The first layer 321 of each of the back electrodes 32 is electrically conductive. The first layer 321 is made of a material containing silver particles and glass. As shown in FIGS. 21 and 22, each first layer 321 is spaced apart from the boundary between the relevant side surface 13 and the back surface 12 of the substrate 10 in the first direction x. Thus, as shown in FIG. 22, the back surface 12 has a region 121 located between the boundary of the side surface 13 and the back surface 12 and the first layer 321.

Figure 22:
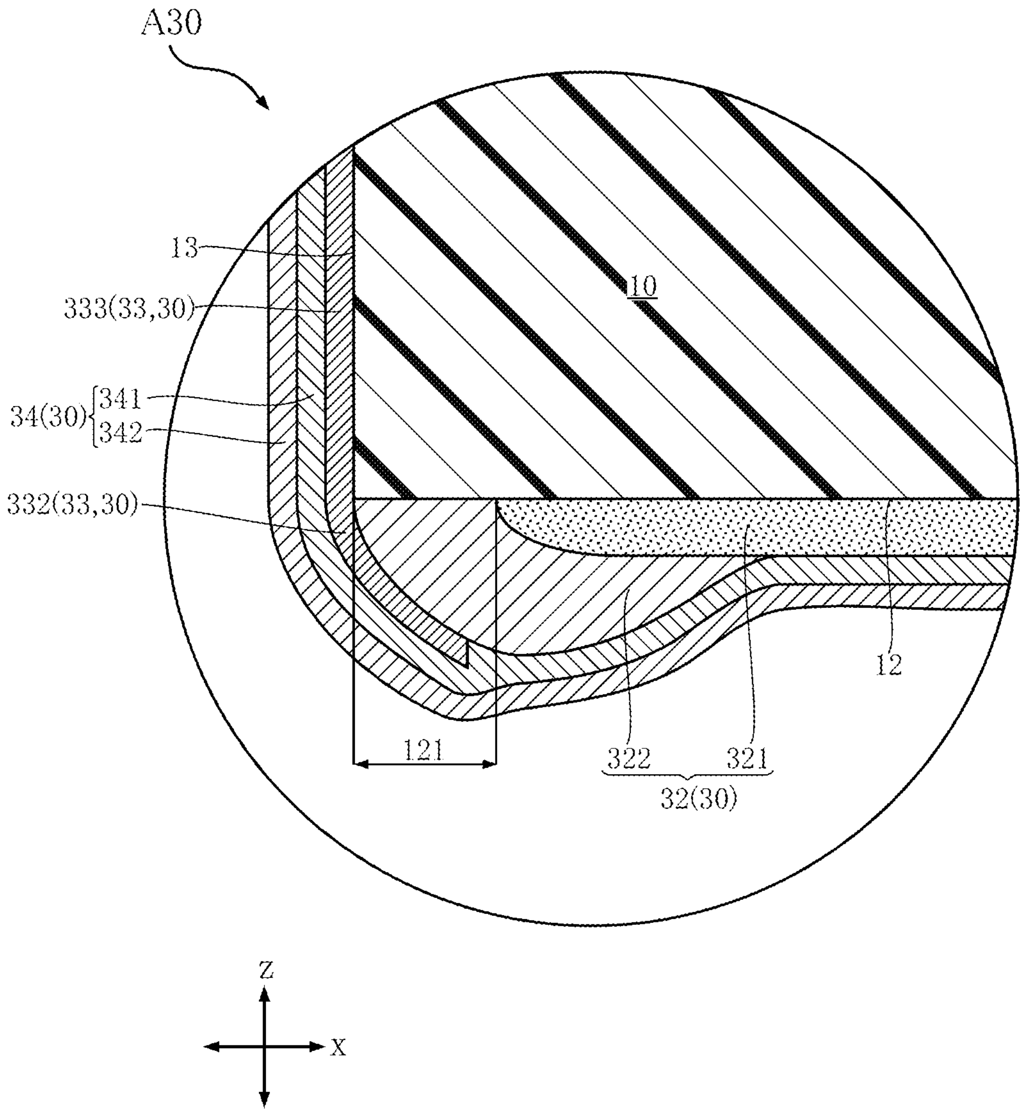
FIG. 22 is an enlarged sectional view showing a part of FIG. 21.

As shown in FIG. 22, the second layer 322 of each back electrode 32 is in contact with the region 121 of the back surface 12 of the substrate 10. In the chip resistor A20, the second layer 322 covers a part of the first layer 321. In the chip resistor 30, the second layer 322 bulges from the back surface 12 in the thickness direction z.

An example of a method for manufacturing the chip resistor A30 is described below based on FIGS. 23 and 24.

This example of the method for manufacturing the chip resistor A30 differs in the step of forming the back electrodes 83 from the example of the method for manufacturing the chip resistor A10 described above. Thus, in the following description of the method for manufacturing the chip resistor A30, only the step of forming the back electrodes 83 is explained.

Figure 23:
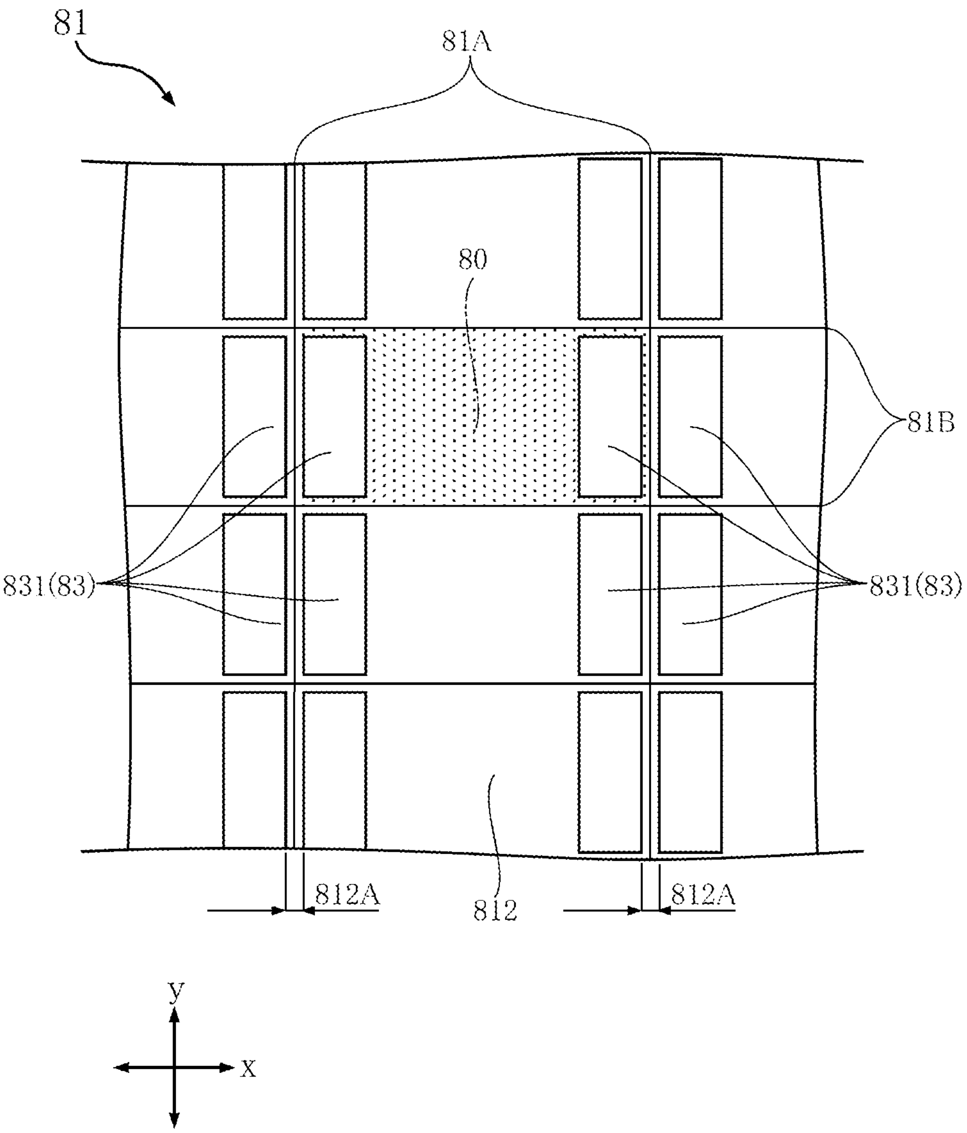
FIG. 23 is a plan view for describing the method for manufacturing the chip resistor shown in FIG. 21.

First, as shown in FIG. 23, a plurality of first layers 831 are formed at a distance in the first direction x from the primary grooves 81A of the base material 81. In this way, a pair of first layers 321 spaced apart from each other in the first direction x are to be formed on each region 80 on the back surface 812 of the base material 81. Between two first layers 831 adjacent across a primary groove 81A is formed a gap 812A, corresponding in location to a part of the back surface 812. The first layers 831 are formed by printing a paste containing silver particles and glass frit on the back surface 812 and then baking the paste.

Figure 24:
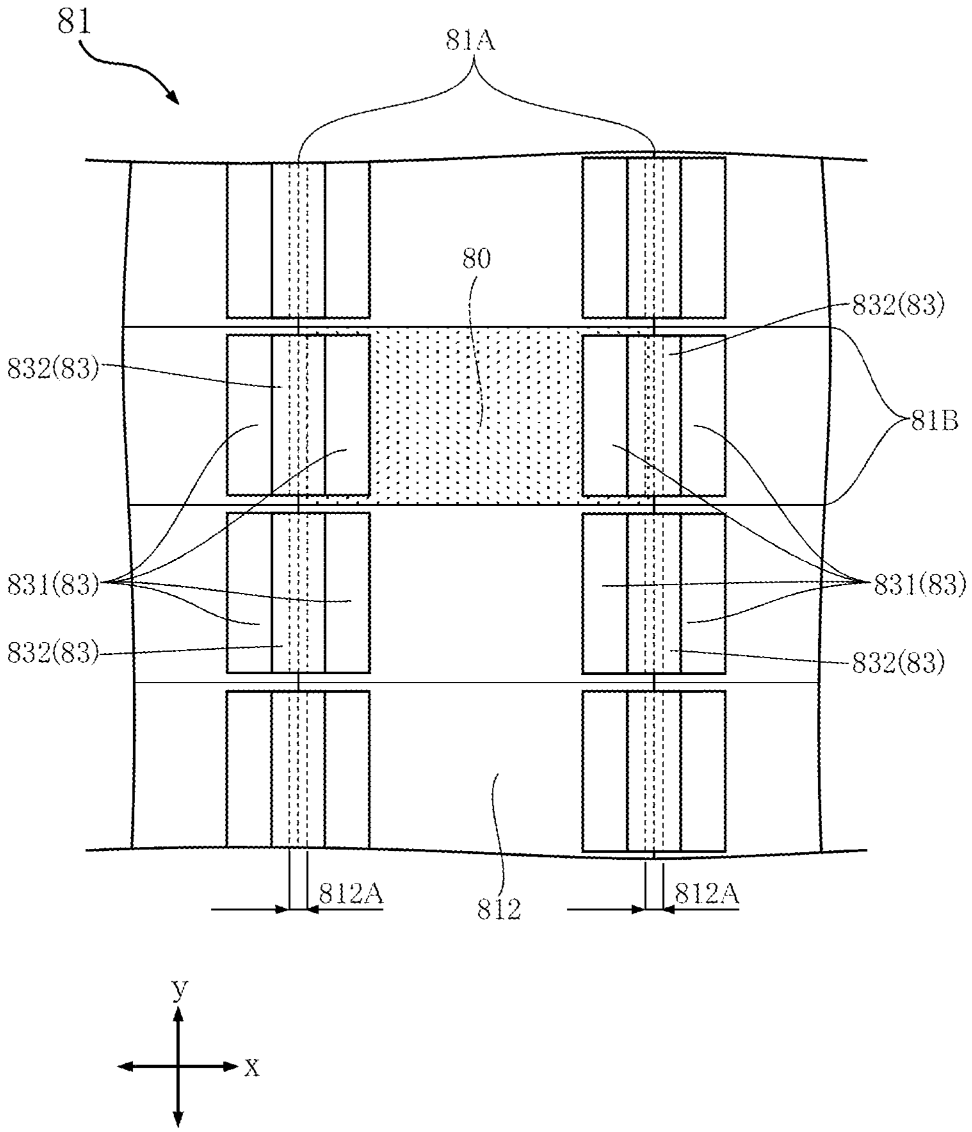
FIG. 24 is a plan view for describing the method for manufacturing the chip resistor shown in FIG. 21.

Next, as shown in FIG. 24, a plurality of second layers 832 are formed in contact with the first layers 831. Each of the second layers 832 is famed to cover respective portions of two adjacent first layers 831 located on each side of a primary groove 81A and to fill the gap 812A. In this step, each second layer 832 is formed such that the portion overlapping with the gap 812A as viewed in the thickness direction z is recessed toward the back surface 812. Each of the second layers 832 is formed by printing a paste, which is mainly composed of epoxy resin and containing silver particles, on the gap 812A and on the two first layers 831 on each side of the gap 812A, and then heat-curing the paste. In this way, the back electrodes 83 are formed.

The advantages of the chip resistor A30 are described below.

In the chip resistor A30, each of the back electrodes 32 has a first layer 321 and a second layer 322. The first layer 321 is in contact with the back surface 12 of the substrate 10. The second layer 322 covers at least a part of the first layer 321. The second layer 322 is made of a material containing metal particles and synthetic resin. Thus, the chip resistor A30 can prevent the solder between the wiring board and the back electrodes 33 from cracking during the use of the chip resistor A30.

In the chip resistor A30, the first layer 321 of each back electrode 32 is electrically conductive and made of a material containing glass. The first layer 321 is spaced apart from the boundary between the relevant side surface 13 and the back surface 12 of the substrate 10 in the first direction x. The second layer 322 of each back electrode 32 is in contact with the region 121 located between the boundary of the side surface 13 and the back surface 12 and the first layer 321. It has been confirmed by the inventor of the present disclosure that the adhesive force between the first layer 321 and the second layer 322 is relatively small in the chip resistor A30. Configuring the first layer 321 and the second layer 322 to be in contact with the back surface 12 of the substrate 10 prevents the back electrode 32 from detaching from the substrate 10.

The second layer 322 of each of the back electrodes 32 covers a part of the first layer 321 and bulges from the back surface 12 of the substrate 10 in the thickness direction z. Such an arrangement makes it easier for air bubbles in the solder to be pushed out by the second layer 322 when the chip resistor A30 is mounted on a wiring board. This improves the mounting strength of the chip resistor A30 on the wiring board.

Fourth Embodiment

Figure 25:
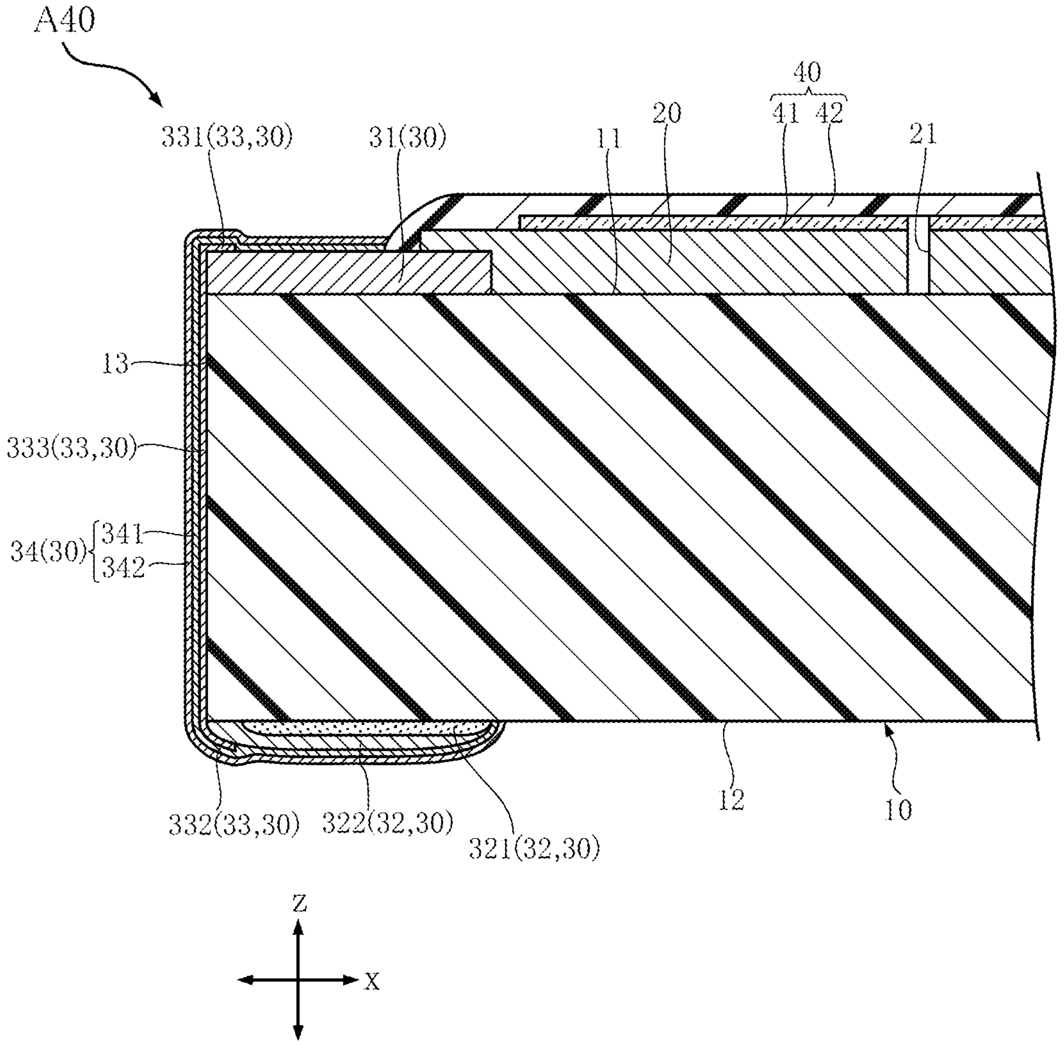
FIG. 25 is a sectional view of a chip resistor according to a fourth embodiment of the present disclosure.

A chip resistor A40 according to a fourth embodiment of the present disclosure is described below based on FIGS. 25 and 26. In these figures, the elements that are identical or similar to those of the chip resistor A10 are denoted by the same reference signs as those used for the chip resistor A10 and are not described. Note that FIG. 25 is a sectional view taken along the same plane as FIG. 5.

The chip resistor A40 differs from the chip resistor A10 in configuration of the back electrodes 32.

The first layer 321 of each of the back electrodes 32 is electrically conductive. The first layer 321 is made of a material containing silver particles and glass. As shown in FIGS. 25 and 26, each first layer 321 is spaced apart from the boundary between the relevant side surface 13 and the back surface 12 of the substrate 10 in the first direction x. Thus, as shown in FIG. 26, the back surface 12 has a region 121 located between the boundary of the side surface 13 and the back surface 12 and the first layer 321.

Figure 26:
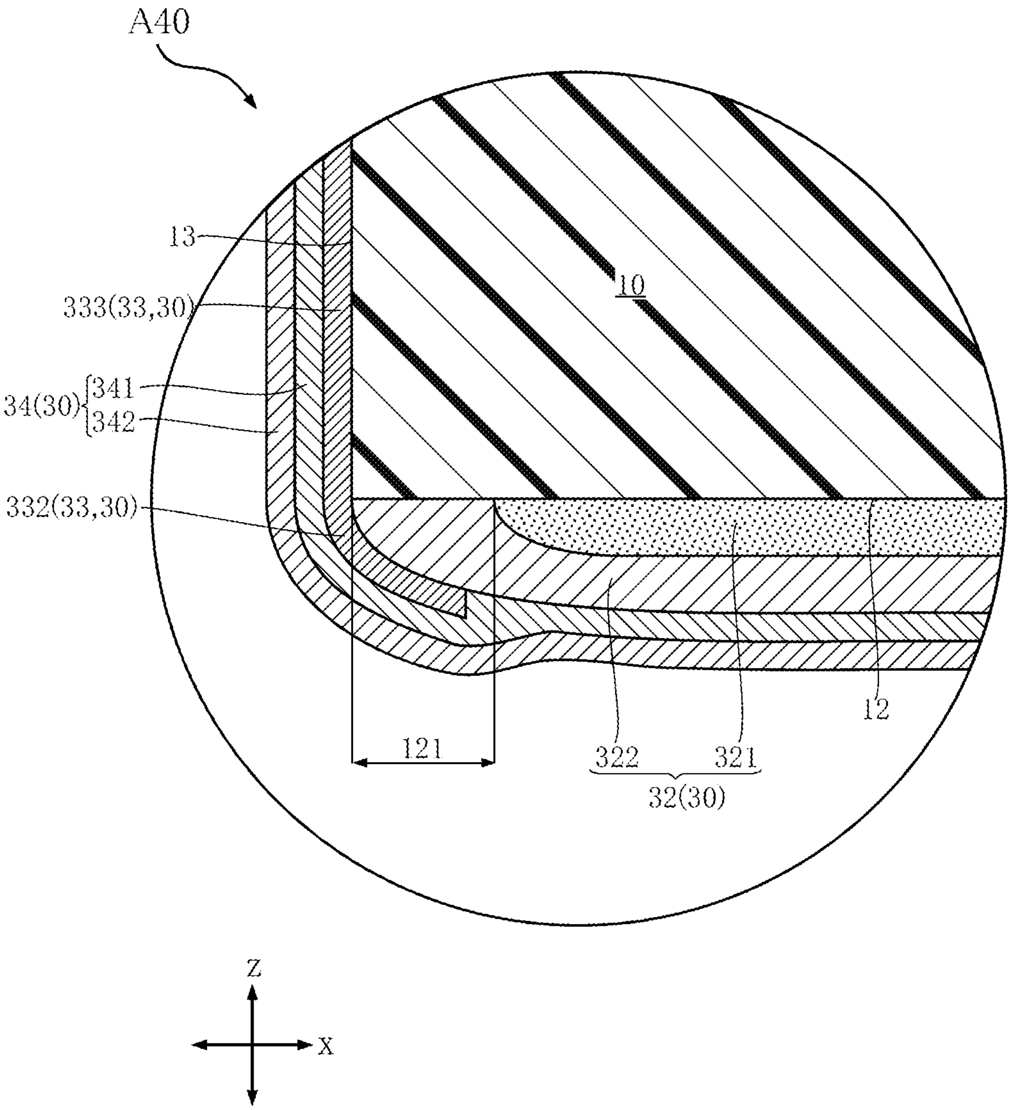
FIG. 26 is an enlarged sectional view showing a part of FIG. 25.

As shown in FIG. 26, the second layer 322 of each back electrode 32 is in contact with the region 121 of the back surface 12 of the substrate 10. In the chip resistor A40, the second layer 322 covers the entirety of the first layer 321.

An example of a method for manufacturing the chip resistor A40 is described below based on FIGS. 27 and 28.

This example of the method for manufacturing the chip resistor A40 differs in the step of forming the back electrodes 83 from the example of the method for manufacturing the chip resistor A10 described above. Thus, only the step of forming the back electrodes 83 is explained below.

Figure 27:
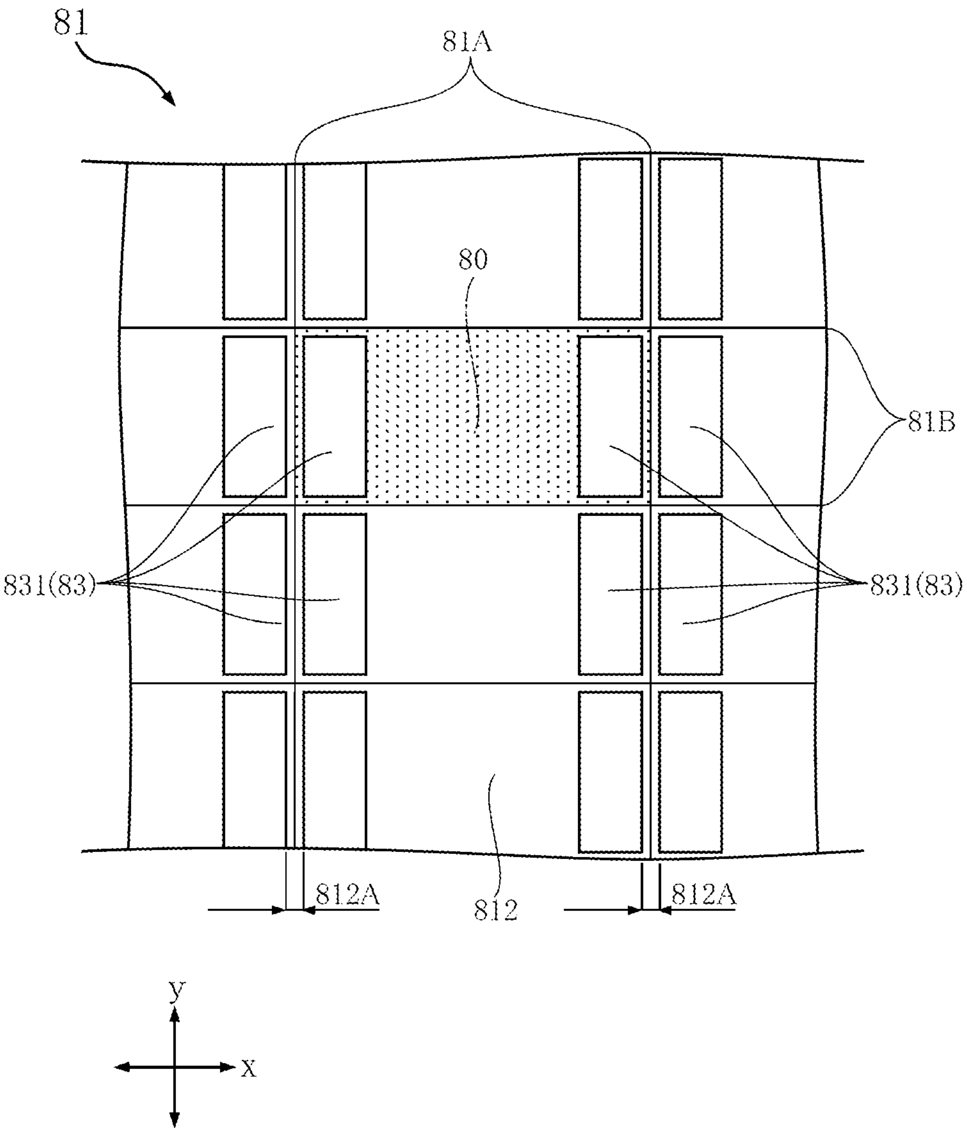
FIG. 27 is a plan view for describing the method for manufacturing the chip resistor shown in FIG. 25.

First, as shown in FIG. 27, a plurality of first layers 831 are formed at a distance in the first direction x from the primary grooves 81A of the base material 81. In this way, a pair of first layers 321 spaced apart from each other in the first direction x are formed on each of the regions 80 on the back surface 812 of the base material 81. Between two first layers 831 adjacent across a primary groove 81A is formed a gap 812A, corresponding in location to a part of the back surface 812. The first layers 831 are formed by printing a paste containing silver particles and glass frit on the back surface 812 and then baking the paste.

Figure 28:
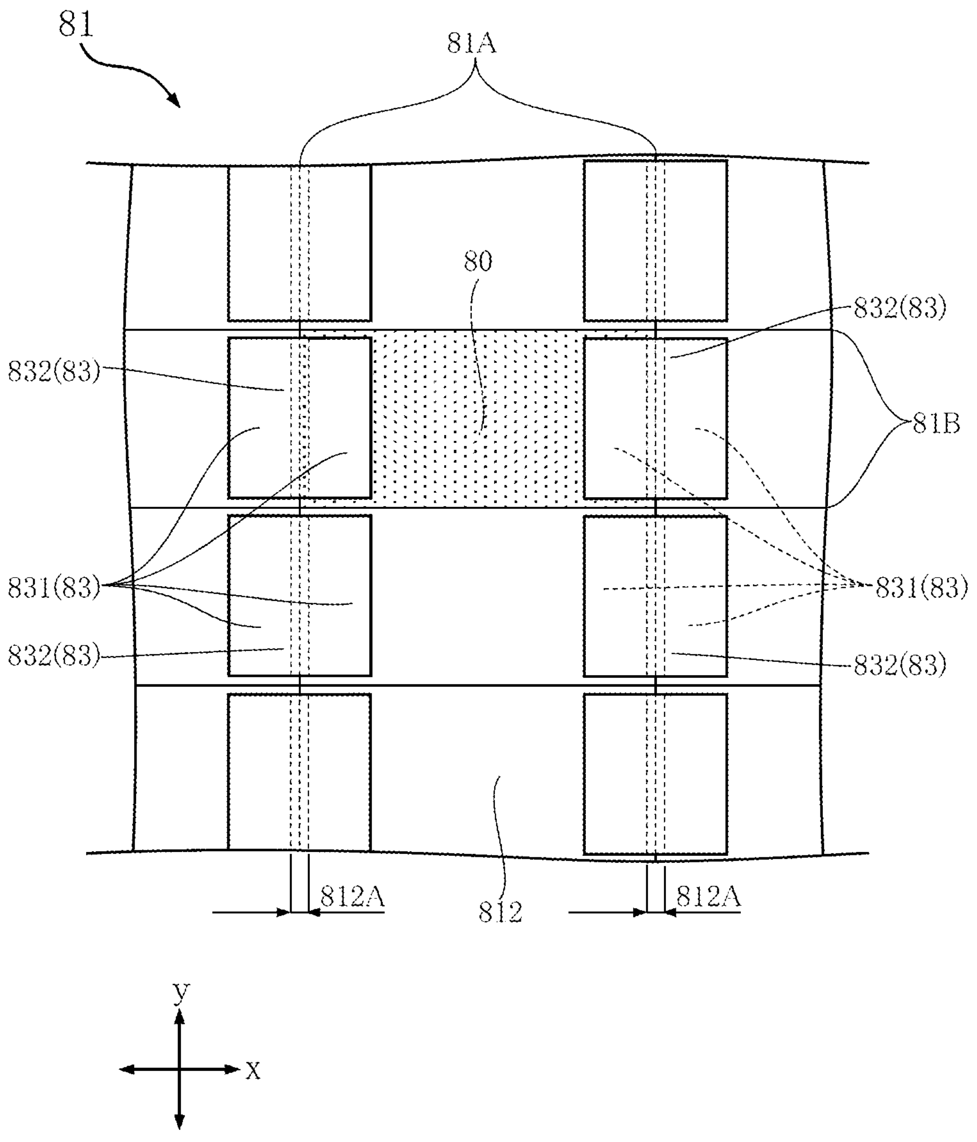
FIG. 28 is a plan view for describing the method for manufacturing the chip resistor shown in FIG. 25.

Next, as shown in FIG. 28, a plurality of second layers 832 are formed in contact with the first layers 831. Each of the second layers 832 is formed to cover the entirety of each of two adjacent first layers 831 located across a primary groove 81A and to fill the gap 812A. Each of the second layers 832 is formed by printing a paste, which is mainly composed of epoxy resin and containing silver particles, on the gap 812A and on the two first layers 831 on each side of the gap 812A, and then heat-curing the paste. In this way, the back electrodes 83 are formed.

The advantages of the chip resistor A40 are described below.

In the chip resistor A40, each of the back electrodes 32 has a first layer 321 and a second layer 322. The first layer 321 is in contact with the back surface 12 of the substrate 10. The second layer 322 covers at least a part of the first layer 321. The second layer 322 is made of a material containing metal particles and synthetic resin. Thus, the chip resistor A40 can also prevent the solder between the wiring board and the back electrodes 34 from cracking during the use of the chip resistor A40.

The present disclosure is not limited to the foregoing embodiments. The specific configuration of each part of the present disclosure may be varied in many ways.

Various embodiments of the present disclosure are defined in the following clauses:

Clause 1.

A chip resistor comprising:

a substrate having a top surface and a back surface facing away from each other in a thickness direction and a pair of side surfaces spaced apart from each other in one direction orthogonal to the thickness direction and connected to the top surface and the back surface;

a pair of top electrodes spaced apart from each other in said one direction and held in contact with the top surface;

a resistor element disposed on the top surface and connected to the pair of top electrodes;

a pair of back electrodes spaced apart from each other in said one direction and held in contact with the back surface; and a pair of side electrodes held in contact with the pair of side surfaces and connected to the pair of top electrodes and the pair of back electrodes, wherein each of the back electrodes has a first layer in contact with the back surface and a second layer covering at least a part of the first layer, and the second layer is made of a material containing metal particles and synthetic resin.

Clause 2.

The chip resistor according to clause 1, wherein the first layer is insulating and made of a material containing synthetic resin, and the second layer covers an entirety of the first layer.

Clause 3.

The chip resistor according to clause 2, wherein the first layer reaches a boundary between a relevant one of the paired side surfaces and the back surface.

Clause 4.

The chip resistor according to clause 2, wherein the first layer is spaced apart from a boundary between a relevant one of the paired side surfaces and the back surface in said one direction, and the second layer is in contact with a region of the back surface located between the first layer and the boundary between the side surface and the back surface.

Clause 5.

The chip resistor according to clause 1, wherein the first layer is electrically conductive and made of a material containing glass, and the first layer is spaced apart from a boundary between a relevant one of the paired side surfaces and the back surface in said one direction.

Clause 6.

The chip resistor according to clause 5, wherein the first layer is made of a material containing silver particles.

Clause 7.

The chip resistor according to clause 5 or 6, wherein the second layer is in contact with a region of the back surface located between the first layer and the boundary between a relevant one of the paired side surfaces and the back surface.

Clause 8.

The chip resistor according to clause 7, wherein the second layer covers a part of the first layer and bulges from the back surface in the thickness direction.

Clause 9.

The chip resistor according to clause 7, wherein the second layer covers an entirety of the first layer.

Clause 10.

The chip resistor according to one of clauses 1-9, wherein the metal particles comprise silver.

Clause 11.

The chip resistor according to one of clauses 1-10, wherein the pair of side electrodes is made of a thin metal film.

Clause 12.

The chip resistor according to clause 11, wherein the thin metal film is made of an alloy containing nickel and chromium.

Clause 13.

The chip resistor according to one of clauses 1-10, wherein the pair of side electrodes is made of a material containing silver particles and synthetic resin.

Clause 14.

The chip resistor according to one of clauses 1-13, further comprising a pair of external electrodes covering the pair of top electrodes, the pair of back electrodes and the pair of side electrodes, wherein the external electrodes are made of a plating layer.

Clause 15.

The chip resistor according to clause 14, wherein each of the pair of external electrodes has an intermediate portion and an outer portion covering the intermediate portion, the intermediate portion covers a relevant one of the paired top electrodes, one of the paired back electrodes that overlaps with the top electrode as viewed in the thickness direction, and one of the paired side electrodes connected to the top electrode and the back electrode, and the intermediate portion contains nickel.

Clause 16.

The chip resistor according to clause 15, wherein the outer portion contains tin.

Clause 17.

The chip resistor according to one of clauses 1-16, wherein the substrate is made of ceramics comprising alumina.

The invention claimed is:

1. A chip resistor comprising:

a substrate having a top surface and a back surface facing away from each other in a thickness direction and a pair of side surfaces spaced apart from each other in one direction orthogonal to the thickness direction and connected to the top surface and the back surface;

a pair of top electrodes spaced apart from each other in the one direction and held in contact with the top surface;

a resistor element disposed on the top surface and connected to the pair of top electrodes;

a pair of back electrodes spaced apart from each other in the one direction and held in contact with the back surface; and a pair of side electrodes held in contact with the pair of side surfaces and connected to the pair of top electrodes and the pair of back electrodes, wherein each of the back electrodes has a first layer in contact with the back surface and a second layer covering at least a part of the first layer, the first layer is spaced apart from a boundary between a first one of the paired side surfaces and the back surface in the one direction, so that the back surface has a region of interval defined between the first layer and the boundary, the first layer being insulating and made of a material containing synthetic resin, a first one of the paired side electrodes comprises a back portion that overlaps with the region of interval as viewed in the thickness direction.

2. The chip resistor according to claim 1, wherein the second layer is made of a material containing metal particles and synthetic resin.

3. The chip resistor according to claim 1, wherein the second layer covers an entirety of the region of interval along the one direction.

4. The chip resistor according to claim 1, wherein the second layer covers an entirety of the first layer.

5. The chip resistor according to claim 4, wherein the second layer is in contact with the region of interval.

6. The chip resistor according to claim 1, wherein the second layer is in contact with the region of interval.

7. The chip resistor according to claim 6, wherein the second layer covers a part of the first layer and bulges from the back surface in the thickness direction.

8. The chip resistor according to claim 6, wherein the second layer covers an entirety of the first layer.

9. The chip resistor according to claim 2, wherein the metal particles comprise silver.

10. The chip resistor according to claim 1, wherein the pair of side electrodes is made of a thin metal film.

11. The chip resistor according to claim 10, wherein the thin metal film is made of an alloy containing nickel and chromium.

12. The chip resistor according to claim 1, wherein the pair of side electrodes is made of a material containing silver particles and synthetic resin.

13. The chip resistor according to claim 1, further comprising a pair of external electrodes covering the pair of top electrodes, the pair of back electrodes and the pair of side electrodes, wherein the external electrodes are made of a plating layer.

14. The chip resistor according to claim 13, wherein each of the pair of external electrodes has an intermediate portion and an outer portion covering the intermediate portion, the intermediate portion covers a first one of the paired top electrodes, one of the paired back electrodes that overlaps with the top electrode as viewed in the thickness direction, and one of the paired side electrodes connected to the top electrode and the back electrode, and the intermediate portion contains nickel.

15. The chip resistor according to claim 14, wherein the outer portion contains tin.

16. The chip resistor according to claim 1, wherein the substrate is made of ceramics comprising alumina.

17. The chip resistor according to claim 1, wherein the back portion is spaced apart from the region of interval in the thickness direction.

18. The chip resistor according to claim 1, wherein a maximum distance between the back portion and the region of interval in the thickness direction is greater than a thickness of the first layer.

* * * * *